US010212254B1

(12) United States Patent
Mahalingaiah

(10) Patent No.: US 10,212,254 B1
(45) Date of Patent: *Feb. 19, 2019

(54) METHOD AND APPARATUS FOR ENABLING MOBILE CLUSTER COMPUTING

(71) Applicant: Rupaka Mahalingaiah, Austin, TX (US)

(72) Inventor: Rupaka Mahalingaiah, Austin, TX (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/217,579

(22) Filed: Jul. 22, 2016

Related U.S. Application Data

(63) Continuation of application No. 13/730,792, filed on Dec. 28, 2012, now Pat. No. 9,467,494.

(60) Provisional application No. 61/581,857, filed on Dec. 30, 2011.

(51) Int. Cl.
*H04L 29/08* (2006.01)
*G06F 9/50* (2006.01)
*H04L 29/06* (2006.01)

(52) U.S. Cl.
CPC ............ *H04L 67/32* (2013.01); *G06F 9/5083* (2013.01); *H04L 29/06* (2013.01); *H04L 29/08072* (2013.01)

(58) Field of Classification Search
CPC .................... H04L 29/08072; H04L 29/06
USPC ........................................................ 709/201
See application file for complete search history.

(56) References Cited

U.S. PATENT DOCUMENTS

| | | | |
|---|---|---|---|
| 6,493,759 B1 * | 12/2002 | Passman | ................. H04L 45/04 455/446 |
| 7,466,810 B1 | 12/2008 | Quon et al. | |
| 7,590,589 B2 | 9/2009 | Hoffberg | |
| 7,599,685 B2 | 10/2009 | Goldberg et al. | |
| 7,657,224 B2 | 2/2010 | Goldberg et al. | |
| 7,668,942 B2 | 2/2010 | Tiwari et al. | |
| 7,698,393 B2 | 4/2010 | Milstein et al. | |
| 7,742,740 B2 | 6/2010 | Goldberg et al. | |
| 7,835,689 B2 | 11/2010 | Goldberg et al. | |
| 7,865,137 B2 | 1/2011 | Goldberg et al. | |
| 7,917,082 B2 | 3/2011 | Goldberg et al. | |
| 7,953,083 B1 | 5/2011 | Evans et al. | |
| 7,961,694 B1 | 6/2011 | Chan et al. | |
| 8,023,663 B2 | 9/2011 | Goldberg | |
| 8,130,758 B2 | 3/2012 | Cohen | |
| 8,204,955 B2 | 6/2012 | McBride et al. | |
| 8,246,454 B2 | 8/2012 | Zalewski | |

(Continued)

OTHER PUBLICATIONS

Dou, A MapReduce Framework for Mobile Systems, 2010.*

(Continued)

*Primary Examiner* — Chris Parry
*Assistant Examiner* — Weiwei Y Stiltner
(74) *Attorney, Agent, or Firm* — Tully Rinckey PLLC; Steven M. Hoffberg

(57) ABSTRACT

A mechanism that enables multiple Mobile Devices to operate in clusters is provided. Using the mobile cluster mechanism framework provided in this invention, Mobile Devices can execute compute intensive tasks in the field by sharing the task between various devices. The invention also contemplates various options of implementing the cluster mechanism on Mobile Devices. The invention further contemplates solutions for the roaming of Mobile Devices.

20 Claims, 19 Drawing Sheets

(56) References Cited

U.S. PATENT DOCUMENTS

| | | |
|---|---|---|
| 8,285,326 B2 | 10/2012 | Carmody et al. |
| 8,462,745 B2 | 6/2013 | Alizadeh-Shabdiz |
| 8,478,297 B2 | 7/2013 | Morgan et al. |
| 8,528,814 B2 | 9/2013 | Wolfe |
| 8,538,457 B2 | 9/2013 | Morgan et al. |
| 8,560,639 B2 | 10/2013 | Murphy et al. |
| 8,566,447 B2 | 10/2013 | Cohen et al. |
| 8,600,830 B2 | 12/2013 | Hoffberg |
| 8,626,933 B2 | 1/2014 | van Steenbergen et al. |
| 8,630,664 B2 | 1/2014 | Alizadeh-Shabdiz et al. |
| 8,638,256 B2 | 1/2014 | Alizadeh-Shabdiz et al. |
| 8,638,725 B2 | 1/2014 | Alizadeh-Shabdiz |
| 8,644,823 B2 | 2/2014 | Rozinov |
| 8,701,991 B2 | 4/2014 | Wolfe |
| 8,769,049 B2 | 7/2014 | Murphy et al. |
| 8,769,055 B2 | 7/2014 | Murphy et al. |
| 8,781,462 B2 | 7/2014 | Osterloh et al. |
| 8,837,363 B2 | 9/2014 | Jones et al. |
| 8,839,364 B2 | 9/2014 | Kramarenko et al. |
| 8,850,036 B2 | 9/2014 | Rozinov et al. |
| 8,874,477 B2 | 10/2014 | Hoffberg |
| 8,890,746 B2 | 11/2014 | Alizadeh-Shabdiz et al. |
| 8,914,396 B2 | 12/2014 | Johnston |
| 8,914,401 B2 | 12/2014 | Johnston |
| 8,929,257 B1 | 1/2015 | Goepp et al. |
| 8,939,362 B2 | 1/2015 | Wolfe |
| 8,953,029 B2 | 2/2015 | Zalewski |
| 8,965,412 B2 | 2/2015 | Alizadeh-Shabdiz et al. |
| 8,970,659 B1 | 3/2015 | Anderson et al. |
| 8,970,660 B1 | 3/2015 | Rudkowski et al. |
| 8,983,493 B2 | 3/2015 | Brachet et al. |
| 9,016,567 B2 | 4/2015 | Wolfe |
| 9,026,652 B1 | 5/2015 | Piehler et al. |
| 9,031,531 B2 | 5/2015 | Miluzzo et al. |
| 9,043,332 B2 | 5/2015 | Noel et al. |
| 9,053,124 B1 | 6/2015 | Dornquast et al. |
| 9,118,654 B2 | 8/2015 | Anderson et al. |
| 9,118,809 B2 | 8/2015 | Anderson et al. |
| 9,148,482 B2 | 9/2015 | Rozinov et al. |
| 9,152,871 B2 | 10/2015 | Soundararajan et al. |
| 9,166,953 B2 | 10/2015 | Luukkala et al. |
| 9,191,447 B2 | 11/2015 | Kramarenko et al. |
| 9,204,131 B2 | 12/2015 | Arrasvuori et al. |
| 9,229,952 B1 | 1/2016 | Meacham et al. |
| 9,251,481 B2 | 2/2016 | Richter et al. |
| 9,251,515 B2 | 2/2016 | Wolfe |
| 9,264,329 B2 | 2/2016 | Chrapko et al. |
| 9,275,338 B2 | 3/2016 | Noel et al. |
| 9,286,386 B2 | 3/2016 | Johnston |
| 9,311,670 B2 | 4/2016 | Hoffberg |
| 9,332,392 B1 | 5/2016 | Conway et al. |
| 9,336,521 B2 | 5/2016 | Wolfe |
| 9,338,285 B2 | 5/2016 | Anderson et al. |
| 9,344,396 B2 | 5/2016 | Geppert et al. |
| 9,344,455 B2 | 5/2016 | Himawan et al. |
| 9,369,884 B2 | 6/2016 | Jones et al. |
| 9,378,065 B2 | 6/2016 | Shear et al. |
| 9,384,334 B2 | 7/2016 | Burba et al. |
| 9,384,335 B2 | 7/2016 | Hunt et al. |
| 9,418,344 B2 | 8/2016 | Fulkerson |
| 9,430,667 B2 | 8/2016 | Burba et al. |
| 9,432,462 B2 | 8/2016 | Richter et al. |
| 9,438,619 B1 | 9/2016 | Chan et al. |
| 9,442,789 B2 | 9/2016 | Noel et al. |
| 9,467,494 B1 * | 10/2016 | Mahalingaiah ......... H04L 67/02 |
| 9,477,787 B2 | 10/2016 | Boldyrev et al. |
| 9,483,506 B2 | 11/2016 | Meacham et al. |
| 9,501,457 B2 | 11/2016 | Heiney et al. |
| 9,547,856 B2 | 1/2017 | Wolfe |
| 9,554,247 B2 | 1/2017 | Jones et al. |
| 9,578,043 B2 | 2/2017 | Mawji et al. |
| 9,584,540 B1 | 2/2017 | Chan et al. |
| 9,614,724 B2 | 4/2017 | Menezes et al. |
| 9,659,050 B2 | 5/2017 | Andrei et al. |
| 9,667,646 B2 | 5/2017 | Muhlestein et al. |
| 9,667,700 B2 | 5/2017 | Feldman et al. |
| 9,679,254 B1 | 6/2017 | Mawji et al. |
| 9,710,559 B2 | 7/2017 | Solomakha et al. |
| 9,717,006 B2 | 7/2017 | Haugen et al. |
| 9,721,296 B1 | 8/2017 | Chrapko |
| 9,727,423 B2 | 8/2017 | Dornquast et al. |
| 9,740,709 B2 | 8/2017 | Mawji et al. |
| 9,772,934 B2 | 9/2017 | Maag et al. |
| 9,785,480 B2 | 10/2017 | Kamawat et al. |
| 9,792,160 B2 | 10/2017 | Shear et al. |
| 9,798,596 B2 | 10/2017 | Vibhor et al. |
| 9,818,136 B1 | 11/2017 | Hoffberg |
| 9,832,224 B2 | 11/2017 | Murugesan et al. |
| 9,898,347 B1 | 2/2018 | Gupta |
| 9,904,579 B2 | 2/2018 | Shear et al. |
| 9,904,604 B2 | 2/2018 | Dornquast et al. |
| 9,916,206 B2 | 3/2018 | Dornquast et al. |
| 9,918,295 B2 | 3/2018 | Jones et al. |
| 9,922,134 B2 | 3/2018 | Chrapko et al. |
| 9,946,738 B2 | 4/2018 | Meacham et al. |
| 9,955,330 B2 | 4/2018 | Miluzzo et al. |
| 9,960,918 B2 | 5/2018 | Luukkala et al. |
| 2002/0169846 A1 * | 11/2002 | Chen ..................... H04L 45/04 |
| | | 709/209 |
| 2003/0005068 A1 | 1/2003 | Nickel et al. |
| 2006/0167784 A1 | 7/2006 | Hoffberg |
| 2007/0087756 A1 | 4/2007 | Hoffberg |
| 2007/0291748 A1 | 12/2007 | Ichiki |
| 2008/0247310 A1 | 10/2008 | Ruffini et al. |
| 2008/0270569 A1 | 10/2008 | McBride et al. |
| 2008/0320138 A1 | 12/2008 | Wada |
| 2009/0276506 A1 | 11/2009 | Tiwari et al. |
| 2010/0174715 A1 | 7/2010 | Tiwari et al. |
| 2010/0228740 A1 | 9/2010 | Cannistraro et al. |
| 2010/0235285 A1 | 9/2010 | Hoffberg |
| 2010/0251142 A1 | 9/2010 | Geppert et al. |
| 2010/0273553 A1 | 10/2010 | Zalewski |
| 2010/0317420 A1 | 12/2010 | Hoffberg |
| 2011/0004513 A1 | 1/2011 | Hoffberg |
| 2011/0060988 A1 | 3/2011 | Mysliwy et al. |
| 2011/0118032 A1 | 5/2011 | Zalewski |
| 2011/0141790 A1 | 6/2011 | Lim |
| 2011/0161341 A1 | 6/2011 | Johnston |
| 2011/0161347 A1 | 6/2011 | Johnston |
| 2011/0182216 A1 | 7/2011 | Ono et al. |
| 2011/0312344 A1 * | 12/2011 | McCahill ......... H04N 21/25841 |
| | | 455/456.1 |
| 2012/0041792 A1 | 2/2012 | Priyadarshan et al. |
| 2012/0151018 A1 | 6/2012 | Bacher et al. |
| 2012/0203823 A1 | 8/2012 | Manglik et al. |
| 2012/0239189 A1 | 9/2012 | Jaud et al. |
| 2012/0246019 A1 | 9/2012 | Wolfe |
| 2012/0252462 A1 | 10/2012 | Fahldieck |
| 2012/0271697 A1 | 10/2012 | Gilman et al. |
| 2012/0317274 A1 | 12/2012 | Richter et al. |
| 2013/0006789 A1 | 1/2013 | Fulkerson |
| 2013/0007864 A1 | 1/2013 | Puflea |
| 2013/0080911 A1 | 3/2013 | Klemm |
| 2013/0103814 A1 | 4/2013 | Carrasco et al. |
| 2013/0117307 A1 | 5/2013 | Vishnoi et al. |
| 2013/0221858 A1 | 8/2013 | Silberstein |
| 2013/0232164 A1 | 9/2013 | Bigney et al. |
| 2014/0012752 A1 | 1/2014 | Wolfe |
| 2014/0047331 A1 | 2/2014 | Feldman et al. |
| 2014/0074850 A1 | 3/2014 | Noel et al. |
| 2014/0141744 A1 | 5/2014 | Miluzzo et al. |
| 2014/0143249 A1 | 5/2014 | Cazzanti et al. |
| 2014/0172863 A1 | 6/2014 | Imbruce et al. |
| 2014/0181110 A1 | 6/2014 | Imbruce et al. |
| 2014/0207542 A1 | 7/2014 | Wolfe |
| 2014/0214663 A1 | 7/2014 | Wolfe |
| 2014/0214667 A1 | 7/2014 | Wolfe |
| 2014/0229383 A1 | 8/2014 | Wolfe |
| 2014/0310589 A1 | 10/2014 | Heiney et al. |
| 2015/0046413 A1 | 2/2015 | Andrei et al. |
| 2015/0063700 A1 | 3/2015 | Soundararajan et al. |
| 2015/0081734 A1 | 3/2015 | Mason |
| 2015/0088920 A1 | 3/2015 | Johnston |
| 2015/0089399 A1 | 3/2015 | Megill et al. |

(56) References Cited

U.S. PATENT DOCUMENTS

| | | |
|---|---|---|
| 2015/0103136 A1 | 4/2015 | Anderson et al. |
| 2015/0106629 A1 | 4/2015 | Anderson et al. |
| 2015/0149286 A1 | 5/2015 | Brown |
| 2015/0172855 A1 | 6/2015 | Mishra et al. |
| 2015/0181200 A1 | 6/2015 | Arrasvuori et al. |
| 2015/0208000 A1 | 7/2015 | Ojanpera |
| 2015/0222615 A1 | 8/2015 | Allain et al. |
| 2015/0223043 A1 | 8/2015 | Miluzzo et al. |
| 2015/0227847 A1 | 8/2015 | Noel et al. |
| 2015/0227918 A1 | 8/2015 | Wolfe |
| 2015/0245409 A1 | 8/2015 | Medapalli |
| 2015/0317651 A1 | 11/2015 | Barker et al. |
| 2015/0350371 A1 | 12/2015 | Woods et al. |
| 2015/0356184 A1 | 12/2015 | Solomakha et al. |
| 2015/0365522 A1 | 12/2015 | Anderson et al. |
| 2016/0019481 A1 | 1/2016 | Roy |
| 2016/0092312 A1 | 3/2016 | Dornquast et al. |
| 2016/0092444 A1 | 3/2016 | Dornquast et al. |
| 2016/0092465 A1 | 3/2016 | Dornquast et al. |
| 2016/0094649 A1 | 3/2016 | Dornquast et al. |
| 2016/0105512 A1 | 4/2016 | Richter et al. |
| 2016/0125000 A1 | 5/2016 | Meacham et al. |
| 2016/0147589 A1 | 5/2016 | Noel et al. |
| 2016/0165323 A1 | 6/2016 | Hollis |
| 2016/0191588 A1 | 6/2016 | Shafer |
| 2016/0203509 A1 | 7/2016 | Sharp et al. |
| 2016/0232463 A1 | 8/2016 | McDonough et al. |
| 2016/0239350 A1 | 8/2016 | Kamawat et al. |
| 2016/0241572 A1 | 8/2016 | Muhlestein et al. |
| 2016/0253659 A1 | 9/2016 | Wolfe |
| 2016/0294853 A1 | 10/2016 | Murugesan et al. |
| 2016/0323138 A1 | 11/2016 | Wun et al. |
| 2016/0328890 A1 | 11/2016 | Keane et al. |
| 2017/0010869 A1 | 1/2017 | Heiney et al. |
| 2017/0031889 A1 | 2/2017 | Heiney et al. |
| 2017/0060920 A1 | 3/2017 | Bollinger et al. |
| 2017/0085413 A1 | 3/2017 | Cencini et al. |
| 2017/0085637 A1 | 3/2017 | Cencini et al. |
| 2017/0097950 A1 | 4/2017 | Meacham et al. |
| 2017/0116103 A1 | 4/2017 | Cencini et al. |
| 2017/0132611 A1 | 5/2017 | Wolfe |
| 2017/0148264 A1 | 5/2017 | Pichette et al. |
| 2017/0213179 A1 | 7/2017 | Schissel et al. |
| 2017/0213295 A1 | 7/2017 | Kritzer et al. |
| 2017/0220403 A1 | 8/2017 | Maag et al. |
| 2017/0230846 A1 | 8/2017 | Wang et al. |
| 2017/0249464 A1 | 8/2017 | Maximov |
| 2017/0257382 A1 | 9/2017 | Muhlestein et al. |
| 2017/0262769 A1 | 9/2017 | McShane et al. |
| 2017/0262866 A1 | 9/2017 | Barker et al. |
| 2017/0264493 A1 | 9/2017 | Cencini et al. |
| 2017/0264674 A1 | 9/2017 | Feldman et al. |
| 2017/0286553 A1 | 10/2017 | Solomakha et al. |
| 2017/0286772 A1 | 10/2017 | Workman et al. |
| 2017/0315876 A1 | 11/2017 | Dornquast et al. |
| 2017/0337124 A1 | 11/2017 | Maag et al. |
| 2017/0372351 A1 | 12/2017 | Sharp et al. |
| 2018/0032382 A1 | 2/2018 | Kamawat et al. |
| 2018/0068358 A1 | 3/2018 | Hoffberg |
| 2018/0113880 A1 | 4/2018 | Metcalf-Putnam et al. |
| 2018/0153501 A1 | 6/2018 | Leal et al. |

OTHER PUBLICATIONS

Marinelli, E. E. (2009). Hyrax: cloud computing on mobile devices using MapReduce (No. CMU-CS-09-164). Carnegie-mellon univ Pittsburgh PA school of computer science.

Huerta-Canepa, Gonzalo, and Dongman Lee. "A virtual cloud computing provider for mobile devices." In Proceedings of the 1st ACM Workshop on Mobile Cloud Computing Services: Social Networks and Beyond, p. 6. ACM, 2010.

Satyanarayanan, Mahadev, Paramvir Bahl, Ramon Caceres, and Nigel Davies. "The case for vm-based cloudlets in mobile computing." IEEE pervasive Computing 8, No. 4 (2009).

Giurgiu, Ioana, Oriana Riva, Dejan Juric, Ivan Krivulev, and Gustavo Alonso. "Calling the cloud: enabling mobile phones as interfaces to cloud applications." In Proceedings of the 10th ACM/IFIP/USENIX International Conference on Middleware, p. 5. Springer-Verlag New York, Inc., 2009.

Chun, Byung-Gon, Sunghwan Ihm, Petros Maniatis, Mayur Naik, and Ashwin Patti. "Clonecloud: elastic execution between mobile device and cloud." In Proceedings of the sixth conference on Computer systems, pp. 301-314. ACM, 2011.

Fernando, Niroshinie, Seng W. Loke, and Wenny Rahayu. "Mobile cloud computing: A survey" Future generation aomputer systems 29, No. 1 (2013): 84-106.

Cuervo, Eduardo, Aruna Balasubramanian, Dae-ki Cho, Alec Wolman, Stefan Saroiu, Ranveer Chandra, and Paramvir Bahl. "MAUI: making smartphones last longer with code offload." In Proceedings of the 8th international conference on Mobile systems, applications, and services, pp. 49-62. ACM, 2010.

Kemp, Roelof, Nicholas Palmer, Thilo Kielmann, and Henri Bal. "Cuckoo: a computation offloading framework for smartphones." In International Conference on Mobile Computing, Applications, and Services, pp. 59-79. Springer, Berlin, Heidelberg, 2010.

Zhang, Xinwen, Anugeetha Kunjithapatham, Sangoh Jeong, and Simon Gibbs. "Towards an elastic application model for augmenting the computing capabilities of mobile devices with cloud computing." Mobile Networks and Applications 16, No. 3 (2011): 270-284.

Dou, Adam, Vana Kalogeraki, Dimitrios Gunopulos, Taneli Mielikainen, and Ville H. Tuulos. "Misco: a mapreduce framework for mobile systems." In Proceedings of the 3rd international conference on pervasive technologies related to assistive environments, p. 32. ACM, 2010.

Chun, Byung-Gon, and Petros Maniatis. "Augmented smartphone applications through clone cloud execution." In HotOS, vol. 9, pp. 8-11. 2009.

Huang, Dijiang, Xinwen Zhang, Myong Kang, and Jim Luo. "MobiCloud: building secure cloud framework for mobile computing and communication." In Service Oriented System Engineering (SOSE), 2010 Fifth IEEE International Symposium on, pp. 27-34. Ieee, 2010.

Klein, Andreas, Christian Mannweiler, Joerg Schneider, and Hans D. Schotten. "Access schemes for mobile cloud computing." In Mobile Data Management (MDM), 2010 Eleventh International Conference on, pp. 387-392. IEEE, 2010.

Shi, Cong, Vasileios Lakafosis, Mostafa H. Ammar, and Ellen W. Zegura. "Serendipity: enabling remote computing among intermittently connected mobile devices." In Proceedings of the thirteenth ACM international symposium on Mobile Ad Hoc Networking and Computing, pp. 145-154. ACM, 2012.

Abolfazli, Saeid, Zohreh Sanaei, Ejaz Ahmed, Abdullah Gani, and Rajkumar Buyya. "Cloud-based augmentation for mobile devices: motivation, taxonomies, and open challenges." IEEE Communications Surveys Tutorials 16, No. 1 (2014): 337-368.

Kumar, Karthik, and Yung-Hsiang Lu. "Cloud computing for mobile users: Can offloading computation save energy." Computer 43, No. 4 (2010): 51-56.

Fan, Xiaopeng, Jiannong Cao, and Haixia Mao. "A survey of mobile cloud computing." zTE Communications (2011).

Sanaei, Zohreh, Saeid Abolfazli, Abdullah Gani, and Rajkumar Buyya. "Heterogeneity in mobile cloud computing: taxonomy and open challenges." IEEE Communications Surveys Tutorials 16, No. 1 (2014): 369-392.

Kovachev, Dejan, Yiwei Cao, and Ralf Klamma. "Mobile cloud computing: a comparison of application models." arXiv preprint arXiv:1107.4940 (2011).

Fernando, Niroshinie, Seng W. Loke, and Wenny Rahayu. "Dynamic mobile cloud computing: Ad hoc and opportunistic job sharing." In Utility and Cloud Computing (UCC), 2011 Fourth IEEE International Conference on, pp. 281-286. IEEE, 2011.

Verbelen, Tim, Pieter Simoens, Filip De Turck, and Bart Dhoedt. "Cloudlets: Bringing the cloud to the mobile user" In Proceedings of the third Acm workshop on Mobile cloud computing and services, pp. 29-36. ACM, 2012.

(56) References Cited

OTHER PUBLICATIONS

Chun, Byung-Gon, and Petros Maniatis. "Dynamically partitioning applications between weak devices and clouds." In Proceedings of the 1st ACM Workshop on Mobile Cloud Computing Services: Social Networks and Beyond, p. 7. ACM, 2010.
Zhang, Xinwen, Joshua Schiffman, Simon Gibbs, Anugeetha Kunjithapatham, and Sangoh Jeong. "Securing elastic applications on mobile devices for cloud computing." In Proceedings of the 2009 ACM workshop on Cloud computing security, pp. 127-134. ACM, 2009.
Yang, Lei, Jiannong Cao, Yin Yuan, Tao Li, Andy Han, and Alvin Chan. "A framework for partitioning and execution of data stream applications in mobile cloud computing." ACM Sigmetrics Performance Evaluation Review 40, No. 4 (2013): 23-32.
Doolan, Daniel C., Sabin Tabirca, and Laurence T. Yang. "Mmpi a message passing interface for the mobile environment." In Proceedings of the 6th International Conference on Advances in Mobile Computing and Multimedia, pp. 317-321. ACM, 2008.
Kosta, Sokol, Andrius Aucinas, Pan Hui, Richard Mortier, and Xinwen Zhang. "Thinkair: Dynamic resource allocation and parallel execution in the cloud for mobile code offloading." In Infocom, 2012 Proceedings IEEE, pp. 945-953. IEEE, 2012.
Black, Michael, and William Edgar. "Exploring mobile devices as Grid resources: Using an x86 virtual machine to run BOINC on an iPhone." In Grid Computing, 2009 10th IEEE/ACM International Conference on, pp. 9-16. IEEE, 2009.
Gordon, Mark S., Davoud Anoushe Jamshidi, Scott A. Mahlke, Zhuoqing Morley Mao, and Xu Chen. "COMET: Code Offload by Migrating Execution Transparently." In OSDI, vol. 12, pp. 93-106. 2012.
Zhang, Xinwen, Sangoh Jeong, Anugeetha Kunjithapatham, and Simon Gibbs. "Towards an elastic application model for augmenting computing capabilities of mobile platforms." In International Conference on Mobile Wireless Middleware, Operating Systems, and Applications, pp. 161-174. Springer, Berlin, Heidelberg, 2010.
Flinn, Jason, SoYoung Park, and Mahadev Satyanarayanan. "Balancing performance, energy, and quality in pervasive computing." In Distributed Computing Systems, 2002. Proceedings. 22nd International Conference on, pp. 217-226. IEEE, 2002.
Kovachev, Dejan, Dominik Renzel, Ralf Klamma, and Yiwei Cao. "Mobile community cloud computing: emerges and evolves." In Mobile Data Management (MDM), 2010 Eleventh International Conference on, pp. 393-395. IEEE, 2010.
Balan, Rajesh Krishna, Mahadev Satyanarayanan, So Young Park, and Tadashi Okoshi. "Tactics-based remote execution for mobile computing." In Proceedings of the 1st international conference on Mobile systems, applications and services, pp. 273-286. ACM, 2003.
Kumar, Karthik, Jibang Liu, Yung-Hsiang Lu, and Bharat Bhargava. "A survey of computation offloading for mobile systems." Mobile Networks and Applications 18, No. 1 (2013): 129-140.
Lowe, David, Amir Mujkanovic, Daniele Miorandi, and Lidia Yamamoto. "Fault tolerance of embryonic algorithms in mobile networks." In International Conference on Evolvable Systems, pp. 49-60. Springer, Berlin, Heidelberg, 2010.
Mishra, Amitabh, and Gerald Masson. "MoCCA: A mobile cellular cloud architecture." In Sarnoff Symposium (SARNOFF), 2012 35th IEEE, pp. 1-6. IEEE, 2012.
Satyanarayanan, Mahadev. "Mobile computing: the next decade." In Proceedings of the 1st ACM workshop on mobile cloud computing services: social networks and beyond, p. 5. ACM, 2010.
Soyata, Tolga, Rajani Muraleedharan, Colin Funai, Minseok Kwon, and Wendi Heinzelman. "Cloud-vision: Real-time face recognition using a mobile-cloudlet-cloud acceleration architecture." In Computers and communications (ISCC), 2012 IEEE symposium on, pp. 000059-000066. IEEE, 2012.
Koukoumidis, Emmanouil, Dimitrios Lymberopoulos, Karin Strauss, Jie Liu, and Doug Burger. "Pocket cloudlets." In ACM SIGPLAN Notices, vol. 46, No. 3, pp. 171-184. ACM, 2011.
Parmar, Ketan B., Nalinibhai N. Jani, Pranav S. Shrivastav, and Mitesh H. Patel. "Mobile grid computing: Facts or fantasy." Int. journal of multidisciplinary science and engineering 4, No. 1 (2013).
Fesehaye, Debessay, Yunlong Gao, Klara Nahrstedt, and Guijun Wang. "Impact of cloudlets on interactive mobile cloud applications." In Enterprise Distributed Object Computing Conference (EDOC), 2012 IEEE 16th International, pp. 123-132. IEEE, 2012.
Miettinen, Antti P., and Jukka K. Nurminen. "Energy Efficiency of Mobile Clients in Cloud Computing." HotCloud 10 (2010): 4-4.
Sanaei, Zohreh, Saeid Abolfazli, Abdullah Gani, and Muhammad Shiraz. "SAMI: Service-based arbitrated multi-tier infrastructure for Mobile Cloud Computing." In Communications in China Workshops (ICCC), 2012 1st IEEE International Conference on, pp. 14-19. IEEE, 2012.
Shiraz, Muhammad, Abdullah Gani, Rashid Hafeez Khokhar, and Rajkumar Buyya. "A review on distributed applicatio processing frameworks in smart mobile devices for mobile cloud computing." IEEE Communications Surveys Tutorials15, No. 3 (2013): 1294-1313.

* cited by examiner

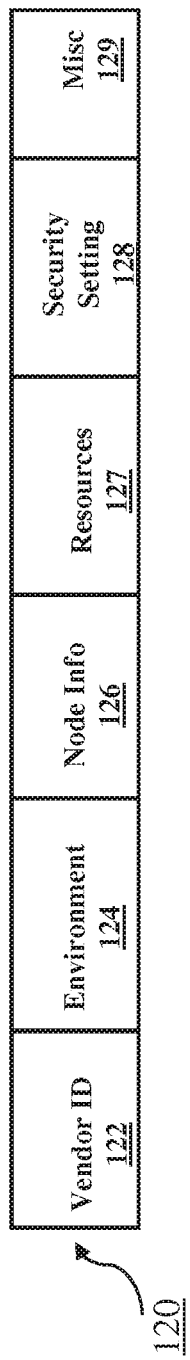
Fig. 4
Fig. 5a
Fig. 5b

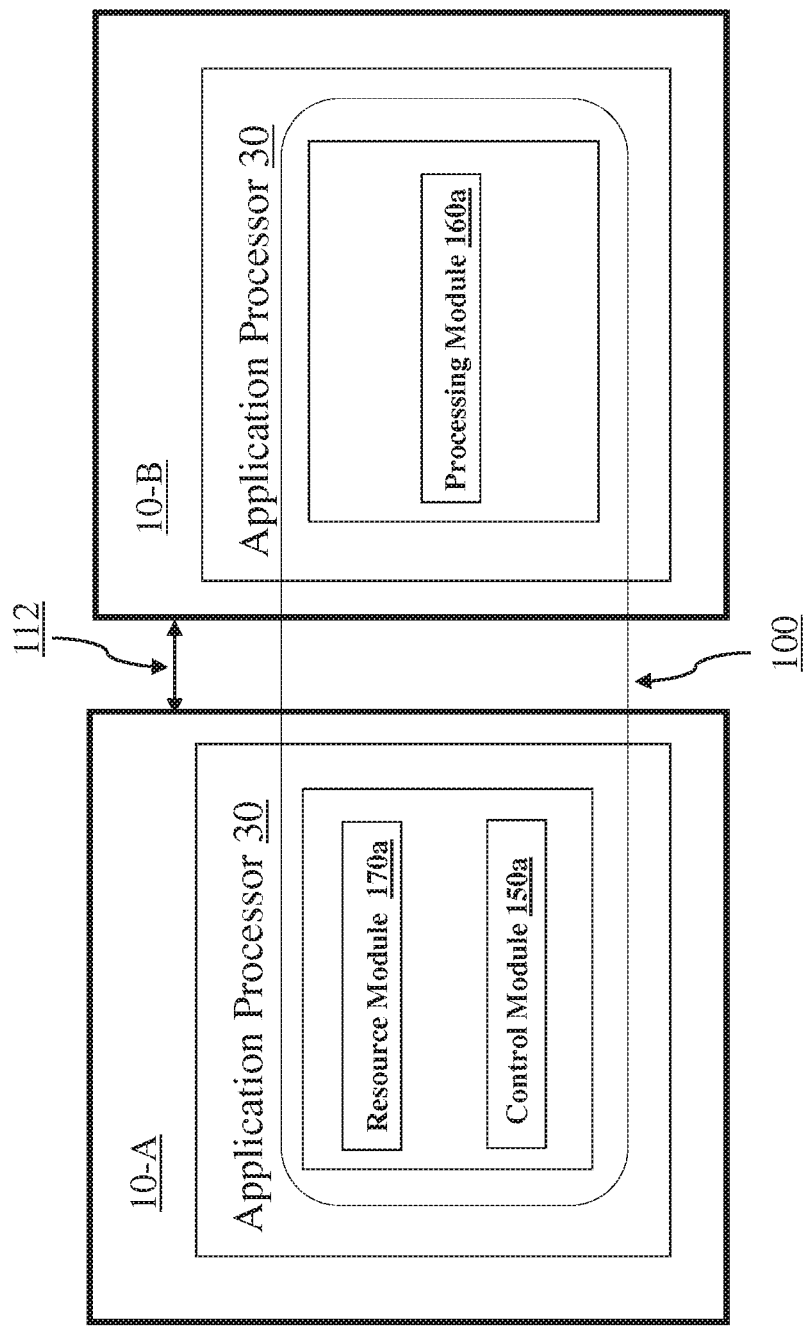

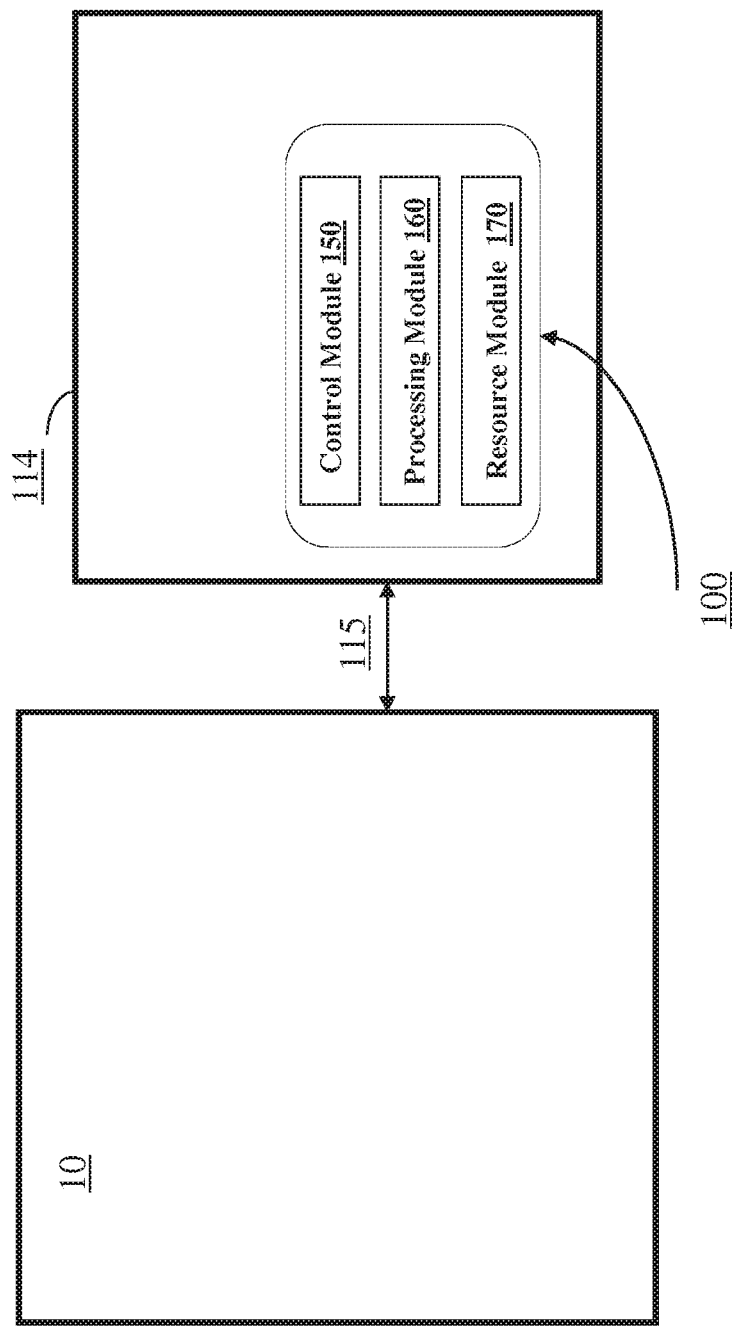

Mobile Device with Add-on with power unit and memory

METHOD AND APPARATUS FOR ENABLING MOBILE CLUSTER COMPUTING

CROSS REFERENCE TO RELATED APPLICATIONS

The present application is a Continuation of U.S. patent application Ser. No. 13/730,792, filed Dec. 28, 2012, now allowed, which claims benefit of priority under 35 U.S.C. § 112(e) to U.S. Provisional Patent Application No. 61/581,857, filed Dec. 30, 2011, the entirety of which are expressly incorporated herein by reference in their entirety.

BACKGROUND OF THE INVENTION

1. Field of the Invention

This invention relates to portable computing devices and, more particularly, to mechanisms and techniques to enable portable computing devices to collectively execute one or more tasks.

2. Brief Description of the Related Art

Electronic digital computational devices like smart phones, tablets, tablet PCs, laptops, netbooks, Personal Digital Assistants (PDAs), handhelds, and other portable computing devices (collectively called 'Mobile Devices') have become a critical part of the life of many individuals and businesses. Advances in these Mobile Devices have enabled significant computing and previously unavailable data communication capabilities. Availability and affordability of these devices is also expanding with their accompanying proliferation.

Mobile Devices have evolved considerably over the past decade and today there is an abundance of small, yet powerful wireless mobile computing devices. Many of these devices have considerable compute power. High-end PDAs and smartphones have powerful computing power along with sensors and Digital Signal Processor (DSP) capabilities. Some of the high-end Mobile Devices even include multiple processors enabling multi-processing capabilities. The future trend is to incorporate more and more powerful multi-core processors into Mobile Devices.

Along with the evolution of the computing power, communication capabilities of the mobile computing devices have also evolved. Today, most high-end mobile computing devices have decent communication capabilities of 20-40 MHz of bandwidth. It is expected that this capability will also continue to grow in the future. Newer technologies like WiMAX are promising to deliver gigahertz of bandwidth for Mobile Devices in the very near future.

The primary intent and purpose of mobile computing devices are to allow users to stay connected, with ability to perform many tasks remotely. Remote tasks include business, financial, personal, and entertainment applications. Mobile Devices of today have succeeded in their primary intent and have even exceeded the expectations of many. This has opened new possibilities beyond serving personal and business needs of individuals.

While individually these Mobile Devices are capable of serving the needs of most users, collectively they present unique computing possibilities. It is possible to use these Mobile Devices collectively to address applications that were traditionally reserved for high-end computers. Enabling Mobile Devices to work together in cluster configurations or parallel processing configurations will enable many new applications for Mobile Devices.

While mobile computing devices cannot match the compute power of supercomputers and traditional clusters of High Performance Computers (HPC), they can provide adequate power to perform some critical operations when operating collectively. In certain applications like real-time monitoring, the proximity of Mobile Devices to the subject will have a distinct advantage over high performance computers located remotely.

Along with the compute power, Mobile Devices need to have adequate communication capabilities to share tasks. Wireless networking has evolved over the past decade and today, Wireless Fidelity (Wi-Fi) has become a popular industry standard. Higher performance and more robust Worldwide Interoperability for Microwave Access (WiMAX) enables gigabits bit rates of wireless communication and is gaining popularity in high end Mobile Devices.

Wireless Local Area Network (WLAN) using Wi-Fi (IEEE standard 802.11) enables 20-40 MHz of bandwidth today while WiMAX (IEEE standard 802.16) offers a bandwidth of 1 GHz. While this does not compare to the multi-gigahertz of bandwidth available in the HPC, it is adequate for carefully architected mobile cluster systems.

Using the Wi-Fi WLAN communication capabilities, industry has developed several mechanisms to network mobile computing devices. Wi-Fi has evolved from the initial version in 1997 at 2.4 GHz frequency to version 'n' in 2009 at 5 GHz frequency and up to 40 MHz bandwidth with a data rate of 150 Mbit/s. More importantly, from a cluster perspective, this version extends the outdoor range to 820 ft (250 m) and supports four Multiple-Input and Multiple-Output (MIMO) streams.

MIMO is the method of utilizing multiple antennas for wireless communications. For wireless networking, MIMO technology appears in Wi-Fi technology, greatly enhancing their capability over the single-antenna counterparts. While MIMO is primarily used by Wi-Fi routers today, it can also be used by mobile computing devices for cluster configuration. MIMO Wi-Fi equipment utilizes the same network protocols and signal ranges that non-MIMO routers do. The MIMO products achieve higher performance by more aggressively transmitting and receiving data over Wi-Fi channels. MIMO signaling technology can increase network bandwidth, range, and reliability at the cost of potential interference with other wireless equipment.

Another technique available in the industry is Virtual Wi-Fi. It is a virtualization architecture for WLAN cards that abstracts a single WLAN card to appear as multiple virtual WLAN cards to the user. The user can then configure each virtual card to connect to a different wireless network. Virtual Wi-Fi allows a user to simultaneously connect his machine to multiple wireless networks using just one WLAN card. This feature can be used effectively in cluster systems. Virtual channels can be used as dedicated control channels and for dedicated data communication.

While the compute power and communication capabilities of Mobile Devices are adequate for performing compute intensive tasks, mechanisms to connect them effectively to harness the available resources is missing.

Industry has developed several mechanisms to connect multiple Mobile Devices. One technology used to network mobile computing devices is MANET, sometimes called a mobile mesh network. MANET is a self-configuring network of Mobile Devices connected by wireless links. Each device in a MANET is free to move independently in any direction, and will therefore change its links to other devices frequently. Each must forward traffic unrelated to its own use, and therefore, be a router. The primary challenge in building a MANET is equipping each device to continuously maintain the information required to properly route the traffic. Such networks may operate by themselves or may be connected to the larger Internet. MANETs are a kind of wireless ad hoc network that usually have a routable networking environment on top of a Link Layer. They are also a type of mesh network, but many mesh networks are not mobile or not wireless.

MANET may be compared to Local Area Networks (LAN) in desktop computer environment. Like LAN, MANET allows Mobile Devices to share data. While MANETs provides mechanisms for networking Mobile Devices, it is not a cluster mechanism. While it provides loose connectivity for Mobile Devices to communicate, but does not provide a control cluster mechanism to share tasks.

As seen, advances in semiconductor and wireless technology have resulted in powerful mobile computing devices that are compute capable as well as have decent communication capabilities. Often, these Mobile Devices are also equipped with sensors along with the DSP capabilities. While quite powerful as individual devices for personal use, they do not have the necessary capability to address complex real-time computational challenges.

There is a growing need to solve tasks involving information and decision processing in the field, close to where events are actually happening. While individual Mobile Devices cannot perform this task, it is possible to distribute the task between several such devices available in the field. It is possible to take advantage of multiple Mobile Devices present in the location in cluster configuration to perform complex computational tasks.

Despite availability of powerful devices and adequate communication capabilities, there are several barriers preventing Mobile Devices from executing high performance real-time mobile computation by sharing task with other Mobile Devices.

Some of the Barriers are:

1. By nature, Mobile Devices are in motion and change their physical locations. This dynamic geographic positioning of the compute units introduces complexities into cluster systems. It poses problems for setting up reliable cluster system in a regular configuration with known neighbors.

2. Availability of any device cannot be guaranteed as devices keep moving in and out of the communication range of a potential cluster system. It poses problems for setting up reliable cluster system when devices are moving in and out of the range.

3. Availability of bandwidth is a limitation due to the limited wireless connectivity in the Mobile Devices. This causes problems for transmitting data and results between various cluster nodes.

4. Power usage is the most critical issue with any Mobile Device. The power constraints in the Mobile Device restrict the amount of computation that can be performed on a Mobile Device. As adding additional resources will increase the use of this precious commodity, it inhibits the addition of additional resources.

5. Most Mobile Devices are area constrained. Adding components to the system could be an issue.

6. Securing the communication between various devices is another issue as wireless communication is inherently insecure. Security mechanism of today, such as encryption, will not work well for Mobile Devices as they require computation demanding power.

Surmounting these barriers is critical to enabling high compute power at the field by utilizing Mobile Devices to share tasks.

It will be advantageous to have a robust mechanism that will enable multiple Mobile Devices to work in tandem to solve computation intense problems. It will be further advantageous for the mechanism to surmount the barriers mentioned above. Preferably, the mechanism should minimize any additional demand on power, bandwidth, and area of the Mobile Devices.

It will be advantageous for the mobile cluster mechanism to be flexible to accommodate various cluster schemes. It will be further advantageous for the mechanism to provide controlled, secure environment to selectively enable qualified Mobile Devices to participate in cluster computations.

SUMMARY OF THE INVENTION

The problems outlined above are in large part solved by a design in accordance with the various embodiments of the invention described here. Embodiments of this invention are adaptable for use in any Mobile Device, computer systems, or other digital designs.

This invention contemplates mechanisms to harness the compute power of several mobile computing devices working towards solving real-time complex problems in the field.

The invention contemplates an innovative cluster framework, Mobile Cluster Mechanism (MCM). MCM provides a framework that enables Mobile Devices to work in conjunction with each other towards solving complex computational problems. Specifically, it enables a controlled environment to securely allocate task amongst selected devices.

MCM may be incorporated in Mobile Devices to enable capabilities to perform real-time computations at the field. MCM enables communication with other similar Mobile Devices in the vicinity to form a cluster environment. A cluster environment is a setup in which two or more devices communicate with each other to execute a given task. MCM also enables dynamic real-time resource allocation. It detects the need for additional computing resources in a Mobile Device based on real-time data analysis. MCM manages the information about other Mobile Devices that are available for computation at a given time. It also provides secure access to these other Mobile Devices when required.

This invention provides various embodiments of MCM that provide mobile cluster framework enabling task sharing among multiple mobile computing devices.

In one embodiment, MCM provides a framework that enables multiple Mobile Devices to work in tandem to solve complex real-time problems.

This invention contemplates various means for implementing MCM. In one embodiment, MCM may be implemented in software. In another embodiment, MCM may be implemented in firmware. In another embodiment, MCM may be implemented in hardware. In yet another embodiment MCM may be implemented as a combination of hardware, software, and/or firmware.

In one embodiment, MCM may be implemented as additional hardware to function alongside mobile computing devices to enhance the computing power of the Mobile Device.

In one embodiment, additional hardware may be a co-processor. In another embodiment, the co-processor may be developed as a chip incorporated into the Mobile Device.

In one embodiment, MCM provides mechanisms to detect and manage resources in a mobile computing device.

In one embodiment, MCM enables the ability for a Mobile Device to dispatch a task to other Mobile Devices.

In one embodiment, MCM enables Mobile Devices to lend their compute power to other Mobile Devices towards executing a given task.

The invention also contemplates on various mechanisms that can be used by Mobile Devices to allocate tasks. In one embodiment, MCM may use the positional information of Mobile Devices to establish cluster configuration. In another embodiment, MCM may use this positional information to allocate tasks.

The invention further contemplates mechanisms to optimize computation environment.

While the preferred embodiments of the invention are primarily beneficial in Mobile Devices, other embodiments of the invention further contemplates using the mechanism for desktop and other computing devices with communication capabilities.

A further understanding of the nature and advantages of the present invention may be realized by reference to the remaining portions of the specification and the drawings.

BRIEF DESCRIPTION OF THE DRAWINGS

So that the manner in which the above recited advantages and features of the present invention, as well as others which will become apparent, are attained and can be understood in detail, a more particular description of the invention summarized above may be had by reference to the embodiment thereof which is illustrated in the appended drawings, which drawings form a part of this specification.

It is to be noted that the appended drawings only illustrate the typical embodiments of the invention and therefore should not to be considered limiting of its scope, for the invention may admit to other equally effective embodiments.

FIG. 4 depicts an embodiment of MCM ID.

FIG. 5a shows an embodiment of the Environment field of MCM ID.

FIG. 5b shows another embodiment of the Environment field of MCM ID.

FIG. 8 shows an embodiment of implementing MCM in two Mobile Devices.

FIG. 9b shows an embodiment of implementing MCM in an Add-on device.

DETAILED DESCRIPTION OF THE PREFERRED EMBODIMENTS

Figure 1:
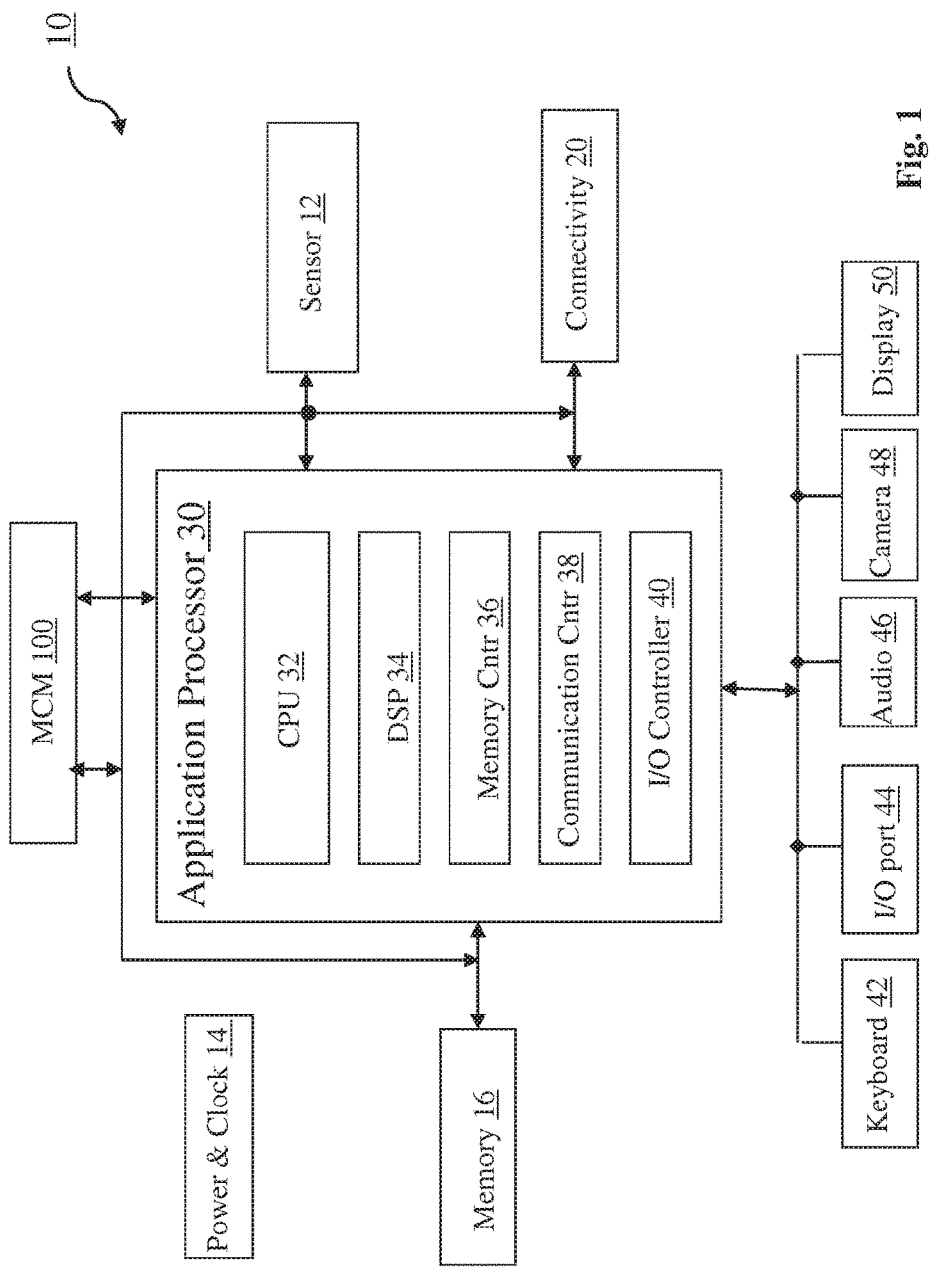
FIG. 1 is a block diagram of one embodiment of a typical Mobile Device configured in accordance with the present invention.

While the invention is susceptible to various modifications and alternative forms, specific embodiments thereof are shown by way of example in the drawing and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

Turning now to FIG. 1, a block diagram of an embodiment of a Mobile Device 10 is shown. A simple embodiment is shown with several functional units to assist in the description of the present invention. The invention applies equally well to all embodiments of Mobile Devices. It should be noted that while a portable device is shown as an example in the description of the invention, embodiments of the present invention applies to any computing devices such as handheld devices, mounted devices, computers, networking devices, and cell phones.

As shown in FIG. 1, Mobile Device 10 may include several functional units such as an Application Processor 30, a Sensor 12, a Power & Clock Unit 14, a Memory Unit 16, a Connectivity Unit 20, a Keyboard/Touchscreen 42, a 1/0 port 44, an Audio device 46, a Camera 48, and a Display 50. Application Processor 30 may include functional units such as a CPU 32, a DSP 34, a Memory Controller 36, a Communication Controller 38, and an 1/0 Controller 20. In accordance with this invention, Mobile Device 10 also includes a Mobile Cluster Mechanism Unit (MCM Unit) 100. Mobile Cluster Mechanism Unit 100 may be coupled to other units of Mobile Device 10 such as Application Processor 30, Memory Unit 16, Sensor 12, and Connectivity Unit 20.

Application Processors 30 is responsible for performing most of the computational operations for Mobile Device 10. CPU 32 is the core of Mobile Device 10. DSP 34 is used in high-performance Mobile Device to provide high quality sound and graphic display. Memory Controller 36 controls the operation of Memory 16. Memory 16 may include of hard drive, SDRAM, DDR, DRAM, Flash RAM, and other forms of magnetic, semiconductor, optic, and/or other forms of memory devices. Communication Controller 38 enables Mobile Device 10 to interface with external world via Connectivity Unit 20. Connectivity Unit 20 enables Mobile Device 10 to communicate via various wired and wireless network media, such as Ethernet, optics, Bluetooth, Global Positioning System (GPS), Global System for Mobile communications (GSM) modem, Wi-Fi, WiMAX, and others.

1/0 Controller 40 of the Application Processor 30 enables Mobile Device 10 to connect to various 1/0 Devices. 1/0 Device Keyboard/Touchscreen Device 42 allows users to either type or touchscreen the data. 1/0 Device 1/0 port 44 allows various 1/0 devices such as the USB devices to be connected to Mobile Device 10. Audio device 46 provides audio interface to Mobile Device 10 such as microphones, speakers etc. Camera 48 captures pictures for Mobile Device 10. Display 50 allows users to control and interact with the Mobile Device 10.

MCM Unit 100 introduces the capability for Mobile Device 10 to work in tandem with other Mobile Devices 10 equipped with MCM Unit 100. It will also enhance the compute power of Mobile Device 10.

Figure 2:
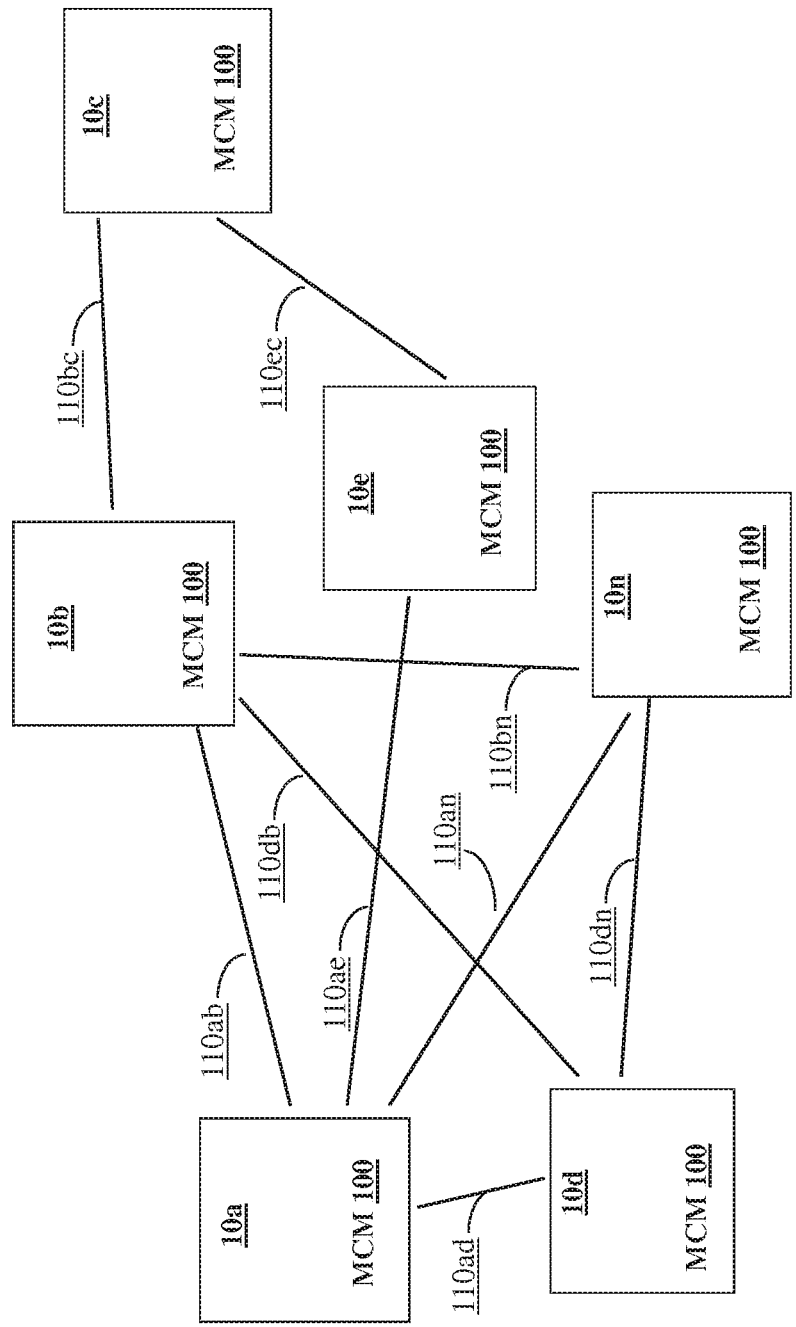
FIG. 2 depicts a simple sample cluster configuration of multiple Mobile Devices in accordance with this invention.

Turning now to FIG. 2, a setup of multiple Mobile Devices 10, designated as Mobile Device 10a, Mobile Device 10b, Mobile Device 10c, Mobile Device 10d, Mobile Device 10e . . . Mobile Device 10n is shown. As shown, each of these Mobile Devices 10 is equipped with MCM Unit 100. MCM Unit 100 of Mobile Device 10a allows it to setup a cluster environment with other Mobile Device 10b, Mobile Device 10c, Mobile Device 10d, Mobile Device 10e, and Mobile Device 10n.

It should be noted that the figure shows a sample deployment. It shows that MCM can be effectively used in random configuration. While the invention contemplates several embodiments, MCM framework is suited equally well to all configurations. In one embodiment, Mobile Devices 10 are configured in complete mesh topology where in each Mobile Device 10 will connect to every other Mobile Device 10 in the field. In another embodiment, they may be configured in torus configuration. In another embodiment, they may be configured in tree configuration. In yet another embodiment, they may be configured in a ring configuration. In another configuration, they may be configured in linear configuration. In yet another embodiment, Mobile Devices 10 may be configured in partial mesh configuration. MCM allows for both random and other configurations used in wired High Performance Computing (HPC) field.

The invention allows for any number of devices to participate in MCM. There is no limitation on the number of Mobile Devices 10 in a given embodiment. In one embodiment, there may be two Mobile Devices 10. In another embodiment, there may be thousands of Mobile Devices 10. The invention applies equally well to any number of Mobile Devices 10.

In FIG. 2, Mobile Devices 10 are shown to connect to other Mobile Devices 10 via a Communication Channel 110. Communication Channel 110 may be any communication scheme, wired or wireless. In one embodiment, Communication Channel 110 is a Wi-Fi connection. In another embodiment, Communication Channel 110 is a WiMAX connection. In another embodiment, Communication Channel 110 represents multiple communication channels. In yet another embodiment, Communication Channel 110 is a radio signal. In another embodiment, Communication Channel 110 is a wired connection such as an Ethernet or a USB. This invention is applicable to all forms communication technology.

In one embodiment, Communication Channel 110 represents unidirectional connections. In another embodiment, Communication Channel 110 represents bidirectional connections.

In one embodiment, each Communication Channel 110 represents one connection. In another embodiment, Communication Channel 110 represents multiple channels of connections. In another embodiment, Communication Channel 110 represents one or more virtual channels of communications.

FIG. 2 shows Mobile Device 10a connecting to Mobile Device 10b via Communication Channel 110ab, Mobile Device 10a connecting to Mobile Device 10e via Communication Channel 110ae, Mobile Device 10a connecting to Mobile Device 10d via Communication Channel 110ad, and Mobile Device 10a connecting to Mobile Device 10n via Communication Channel 110an. Similarly, it shows Mobile Device 10d connecting to Mobile Device 10b via Communication Channel 110db and Mobile Device 10d connecting to Mobile Device 10n via Communication Channel 110dn. Mobile Device 10b connects to Mobile Device 10c via Communication Channel 110bc and Mobile Device 10b connects to Mobile Device 10n via Communication Channel 110bn. Mobile Device 10e connects to Mobile Device 10c via Communication Channel 110ec.

MCM Unit 100 of Mobile Devices 10 establishes and controls the cluster operations. Referring to FIG. 2, when Mobile Device 10a wants to setup a cluster environment, MCM Unit 100 of Mobile Device 10a will check for other Mobile Devices in the communication range that are equipped with MCM Unit 100. If it finds any, it will establish a cluster environment. FIG. 2 shows a cluster environment with Mobile Device 10a, Mobile Device 10b, Mobile Device 10c, Mobile Device 10d, Mobile Device 10e, and Mobile Device 10n. MCM allows for devices to talk directly to other devices in the environment like Mobile Device 10a communicating with Mobile Device 10b, Mobile Device 10d, Mobile Device 10e, and Mobile Device 10n. It will allow indirect communication such as Mobile Device 10a communicating with Mobile Device 10c through Mobile Device 10b via 110ab and 110bc, or through Mobile Device 10e via 110ae and 110ec. Here, Mobile Device 10b and Mobile Device 10e act as intermediate devices for communication between Mobile Device 10a and Mobile Device 10c.

In this manner, MCM enables range extension allowing large number of Mobile Devices 10 to form cluster environment for sharing computation tasks.

For a device to participate in MCM, the device should have MCM Unit 100 of FIG. 1. Such a device will be able to execute tasks in conjunction with other Mobile Devices 10 that are equipped with MCM Unit 100.

In addition to being equipped with MCM Unit 100, Mobile Devices 10 must be setup to participate in a given MCM Environment. An MCM Environment is an MCM setup that enables certain MCM enabled devices to work together. Each MCM enabled Mobile Device that can participate in a given MCM environment has to be set up to participate in the given environment.

Figure 3:
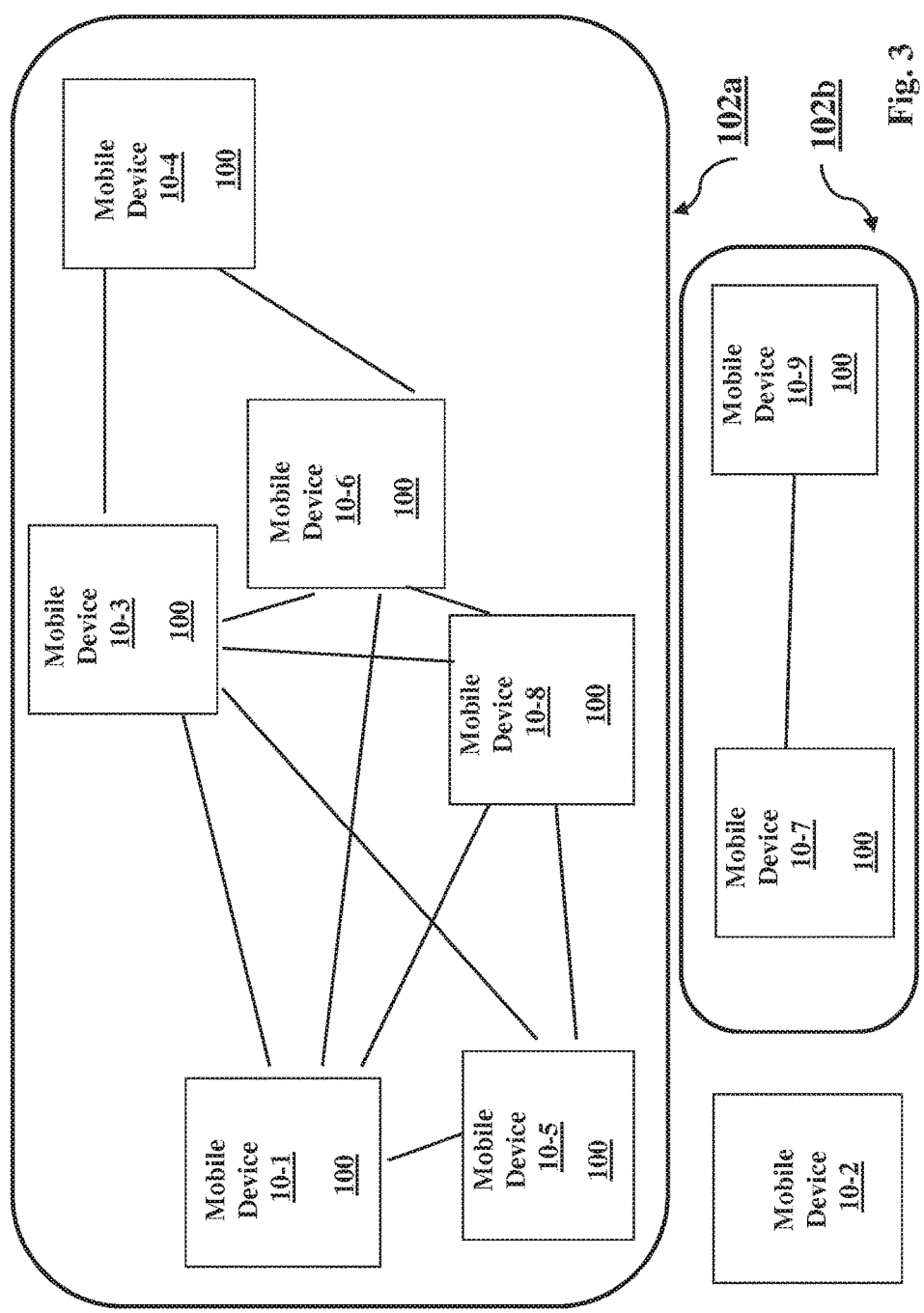
FIG. 3 depicts sample configurations of MCM environment.

Turning now to FIG. 3, a sample working of MCM Environments 102 is shown. Two environments, MCM Environment 102a and MCM Environment 102b are depicted in the figure. In the figure, nine Mobile Devices 10 are shown. As seen, all Mobile Devices 10, except for Mobile Device 10-2, are equipped with MCM Unit 100. With these MCM Unit 100, Mobile Device 10-1, Mobile Device 10-3, Mobile Device 10-4, Mobile Device 10-5, Mobile Device 10-6, Mobile Device 10-7, Mobile Device 10-8, and Mobile Device 10-9 are eligible to participate in MCM.

Mobile Device 10-1, Mobile Device 10-3, Mobile Device 10-4, Mobile Device 10-5, Mobile Device 10-6, and Mobile Device 10-8 belong to MCM Environment 102a and can share tasks among themselves. Mobile Device 10-7 and Mobile Device 10-9 belong to MCM Environment 102b and can share tasks between them. Devices belonging to MCM Environment 102a cannot share tasks with devices of MCM Environment 102b and vice-versa.

In one embodiment, Mobile Device 10 may participate in more than one MCM Environment 102.

In the figure, Mobile Devices 10 are shown to connect to up to four other Mobile Devices 10. Mobile Device 10-1 is connected to Mobile Device 10-3, Mobile Device 10-5, Mobile Device 10-6, and Mobile Device 10-8 directly.

Mobile Device 10-1 connects to Mobile Device 10-4 through Mobile Device 10-3 or Mobile Device 10-6 indirectly. The indirect connection will be dictated by factors such as availability of direct connection channel and proximity.

Mobile Device 10-7 and Mobile Device 10-9 belong to MCM Environment 102b. These devices cannot participate in activities of MCM Environment 102a.

Mobile Device 10-2 is not equipped with MCM Unit 100. Therefore, it cannot participate in either MCM Environment 102a or MCM Environment 102b. Mobile Device 10-5 will work with Mobile Device 10-8 and Mobile Device 10-3 even though Mobile Device 10-2 is physically closer to it.

While establishing an MCM Environment, Mobile Device 10 that is establishing the environment checks for the available devices in its range. In one embodiment, if a Mobile Device 10 is be beyond the range of another Mobile Device 10, it can connect indirectly to this Mobile Device 10 via other Mobile Devices. This enables to expand the range of MCM through indirect connectivity.

Indirect connectivity is crucial in a mobile environment as the devices will be in motion, and could leave the area before it has finished executing its assigned task. This dynamic nature of Mobile Devices needs to be taken into account in a mobile cluster system. MCM allows for such 'roaming' situations.

Accounting for the roaming of Mobile Devices is a crucial issue in implementing a stable mobile cluster system. MCM handles this problem with several innovative mechanisms.

In one embodiment, MCM uses indirect connectivity to handle roaming. Referring to FIG. 3, Mobile Device 10-1 could be setting up the MCM Environment 102a. At the point of setting up the environment, Mobile Device 10-4 may have been in the direct communication range of Mobile Device 10-1. At some point, Mobile Device 10-4 may have to move to a location where it will not able to communicate with Mobile Device 10-1. In MCM, this situation is handled by indirect communication. Mobile Device 10-4 will communicate with Mobile Device 10-1 via Mobile Device 10-3 and/or Mobile Device 10-6.

In another embodiment, MCM allows for a Mobile Device that needs to move out of the range to sign-off with warning. This allows the task-assigning device to reassign the task to other units. For instance, in FIG. 3, if Mobile Device 10-4 has to move out of the range of communication of all Mobile Devices in MCM Environment 102a, it will do so by warning its departure. In one embodiment, this warning is done by periodically ping. In another embodiment, this warning is done by query. In yet another embodiment, this warning is done by pre-notification.

In one embodiment, roaming is handled by Mobile Devices that are about roam out of the range devices pre-warning other devices in the environment about its potential roaming. In one embodiment, this is achieved by border devices broadcasting their exit.

In one embodiment, positional information of the Mobile Devices may be used to manage roaming. In one embodiment, this positional information may be relative position of Mobile Devices 10. In another embodiment, this positional information may be geographic co-ordination. In one embodiment, these geographic co-ordinates may be determined by GPS. In this embodiment, by knowing the GPS co-ordinates of devices in MCM, Mobile Devices 10 in MCM can determine when a device is near the boundary of a MCM range and could potentially move out-of-range.

When scheduling a task, a Mobile Device will consider other Mobile Devices in its environment. MCM allows the devices to check for the workload of a device before assigning new tasks. For instance, Mobile Device 10-1 will check to see if any of its direct connect nodes are available to execute a task. It may realize that Mobile Device 10-8 is busy. It will then pass this device and assign the task to other devices.

In one embodiment, one or more Mobile Devices 10 may be designated as Master devices and other devices may be designated as Slave devices. In this setup, only Master devices can setup a MCM environment. Referring to FIG. 3, Mobile Device 10-1 may be designated as a Master for MCM Environment 102a. Mobile Device 10-3, Mobile Device 10-4, Mobile Device 10-5, Mobile Device 10-6, and Mobile Device 10-8 may be designated as Slaves. Only Mobile Device 10-1, as the master, can initiate the setting up of Environment 102a. It is responsible for gathering information of other available devices, setting up Environment 102a, keeping track of devices in the range, allocating tasks, distributing tasks, managing tasks, and dissolving the environment.

In one embodiment, there may be multiple Masters that share the environment management responsibility. In another embodiment, there may be multiple Masters with one or more designated as Primary Masters and other masters as Secondary Masters. Primary Masters setup and manage the environment. Secondary Masters monitor the environment. Secondary masters may become the active Masters if Primary Master becomes inactive, is not accessible, and/or is overloaded with tasks.

In another embodiment, there can be multiple Primary Masters, each Master being responsible for specific functions of MCM Environment. For instance, one Master may setup and manage devices. Another Master may allocate tasks. Another Master may distribute data and controls.

MCM operation involves initially setting up Mobile Devices 10 to participate in an MCM environment. A key part of this setup is MCM ID. Each Mobile Device with MCM Unit 100 is assigned a unique identifier, MCM ID. Typically, the MCM ID will be part of the MCM Unit 100. Each MCM enabled Mobile Device 10 will have at least one MCM ID associated with it. In one embodiment, Mobile Device 10 will be assigned one MCM ID. In another embodiment, Mobile Device 10 may have more than one MCM ID. For instance, if the device is part of two MCM environments, it may have two identifiers.

Turning now to FIG. 4, an embodiment of an MCM ID 120 is shown. MCM ID 120 is used by MCM in operations such as identifying a device, designating the mode of operation, resource identification, and task allocation. MMD ID 120 comprises of several fields and is flexible to accommodate a wide range of deployments.

A sample MCM ID is shown in FIG. 4 with six fields. It should be noted that many possible implementations of MCM ID 120 are possible. An MCM ID may have one to 'n' fields, where 'n' can be as small as two or a very large number.

The sample embodiment of MCM ID 120 in FIG. 4 consists of a Vendor ID 122, an Environment 124, a Node Info 126, a Resources 127, a Security Setting 128, and a Misc 129 fields.

Vendor ID 122 identifies a specific group, company, unit, or service provider that has the ownership or service of the Mobile Device 10. In one embodiment, the participation of a given Mobile Device 10 in a given MCM environment is restricted to one or more values of Vendor ID 122. In another embodiment, all values of Vendor ID 122 may be allowed to participate in a given MCM environment.

MCM enables a mobile cluster environment for task sharing towards solving complex computational problems in the field. An MCM Environment is a MCM setup that has several MCM enabled devices that can work in together. Environment 124 identifies one or more MCM environments that the Mobile Device 10 is allowed to participate. An MCM environment allows for controlled operation of a given scheme. Each MCM enabled Mobile Device that can participate in a given MCM environment has to be set up to participate in a given environment. In FIG. 4, Environment 124 identifies one or more MCM environment. An MCM environment is dynamically setup for cluster operations.

Turning now to FIG. 5a, an embodiment of Environment 124 is shown. In this embodiment, Environment 124 consists of two fields. The first field is a Number of Environment 124a and next is a Starting Environment 124b. Mobile Device 10 with this Environment 124 can participate in the number specified 124a number of MCM environments. The first MCM environment starts with Starting Environment 124b.

Another embodiment of Environment 124 is shown in FIG. 5b. In this embodiment, Environment 124 consists of three fields—a Key Environment 124c, a Mask 124d, and a Number of Eligible Environment 124e. Based on the Key Environment 124d and Mask 124d, several environments are enabled by Eligible Environment 124e.

Turning back to FIG. 4, Node Info 126 field of MCM ID 120 contains information specific to that Mobile Device 10 participating in a given MCM environment, Resources 127 contains information on the resources available in that specific Mobile Device 10, Security Settings 128 controls the security operations of the Mobile Device 10 in MCM. Misc 129 contains other MCM operation specific information.

In one embodiment, MCM ID may be implemented in software. In another embodiment, MCM ID may be implemented in hardware. In yet another embodiment, MCM ID may be implemented in firmware. In another embodiment, part of the MCM ID may be implemented in hardware, part in software, and/or in firmware.

In one embodiment, MCM ID may be fixed. In another embodiment, MCM ID may be programmable. In yet another embodiment, part of the MCM ID may be fixed and part programmable.

Figure 6:
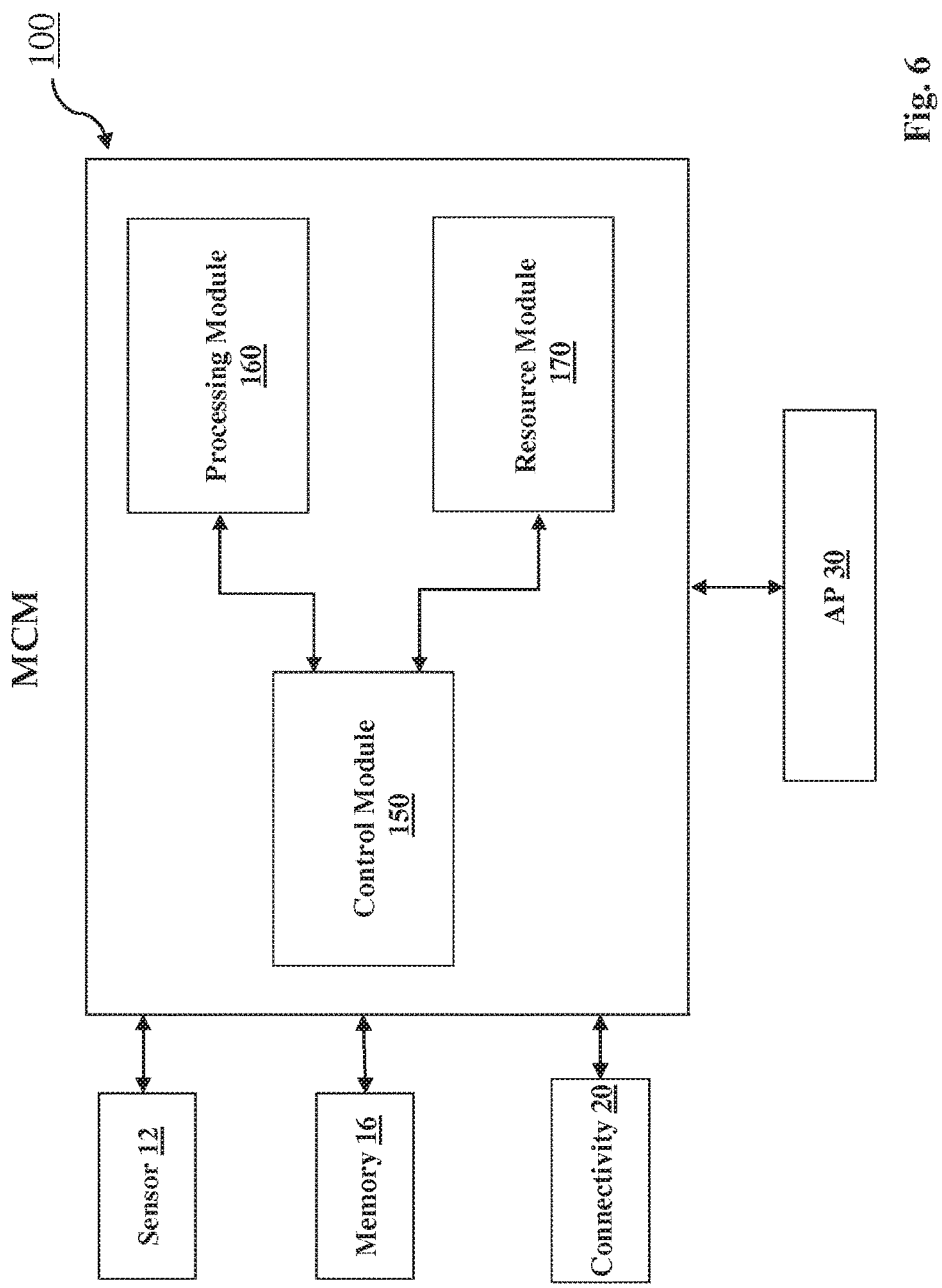
FIG. 6 is a block diagram of one embodiment of implementation of MCM unit.

Turning now to FIG. 6, a sample block diagram of MCM Unit 100 is shown. While there are many possible implementations for MCM Unit 100, FIG. 6 depicts a preferred embodiment for a flexible, modular implementation of MCM Unit. This sample implementation should not be considered as limiting the scope of the invention, but as an embodiment to illustrate the functioning of MCM.

In FIG. 6, MCM Unit 100 is shown to comprise of three modules a Control Module 150, a Processing Module 160, and Resource Module 170. It is shown connecting to Application Processor 30, Sensor 12, Memory 16, and Connectivity 20 (of FIG. 1).

Control Module 150 controls MCM setup, operation, and management functions. It implements communication control, cluster functionality, and management of other MCM modules. This module may be implemented in software running on the Mobile Device. It can also be implemented hardware or firmware.

Processing module 160 executes the tasks assigned to it. It may be implemented in software or hardware in the Mobile Device. It can also be implemented as a plugin module that hosts a co-processor chip and a memory module. It will handle the execution of special algorithms needed to perform intended computations.

Resource Module 170 is responsible for dynamically managing the available devices, recognizing the demand for compute power, distributing tasks to devices, and managing dynamic allocation. This module may be implemented in either hardware or software.

All three of these MCM modules may be implemented in either hardware or software targeting various hardware and software platforms. In one embodiment, software modules may be developed in C/C++ and Java/C++ and hardware modules may be developed as Field Programmable Gate Arrays (FPGAs) or ASICs. Software (including firmware) and hardware implementations include many possible methods of implementations that are in practice in the industry.

The modular architecture of MCM enables a wide range of implementation options. In one embodiment, MCM is implemented in software. In another embodiment, it is implemented in hardware. In another embodiment, it is implemented as a combination of hardware, firmware, and/ or software.

In one embodiment, all MCM modules may be implemented within Mobile Device 10. In another embodiment, all MCM modules are implemented as one or more add-on devices. In yet another embodiment, part of MCM is implemented in the Mobile Device and the rest on one in more add-on devices.

To illustrate the wide range of possible implementation of MCM, several embodiments are shown next.

Figure 7A:
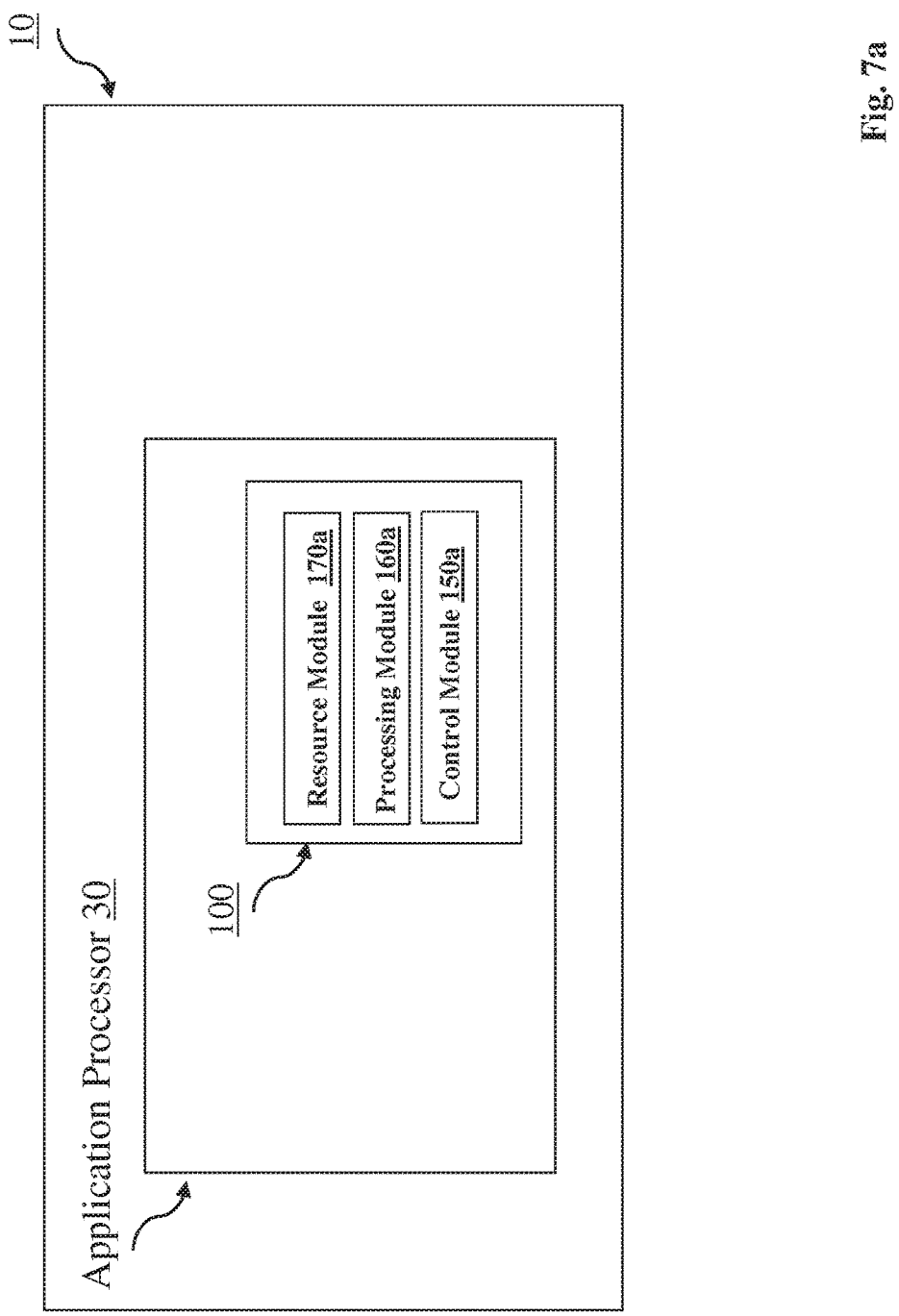
FIG. 7a shows an embodiment of implementing MCM in a Mobile Device as a software module.

Turning now to FIG. 7a, an embodiment of implementation of MCM is shown. In this embodiment, MCM Unit 100 is implemented in software running within Application Processor 30 located in Mobile Device 10. MCM Unit 100 comprises of a software implementation of Control Module 150 shown as a Control Module 150a, a software implementation of Processing Module 160 shown as a Processing Module 160a, and a software implementation of Resource Module 170 shown as a Resource Module 170a.

Figure 7B:
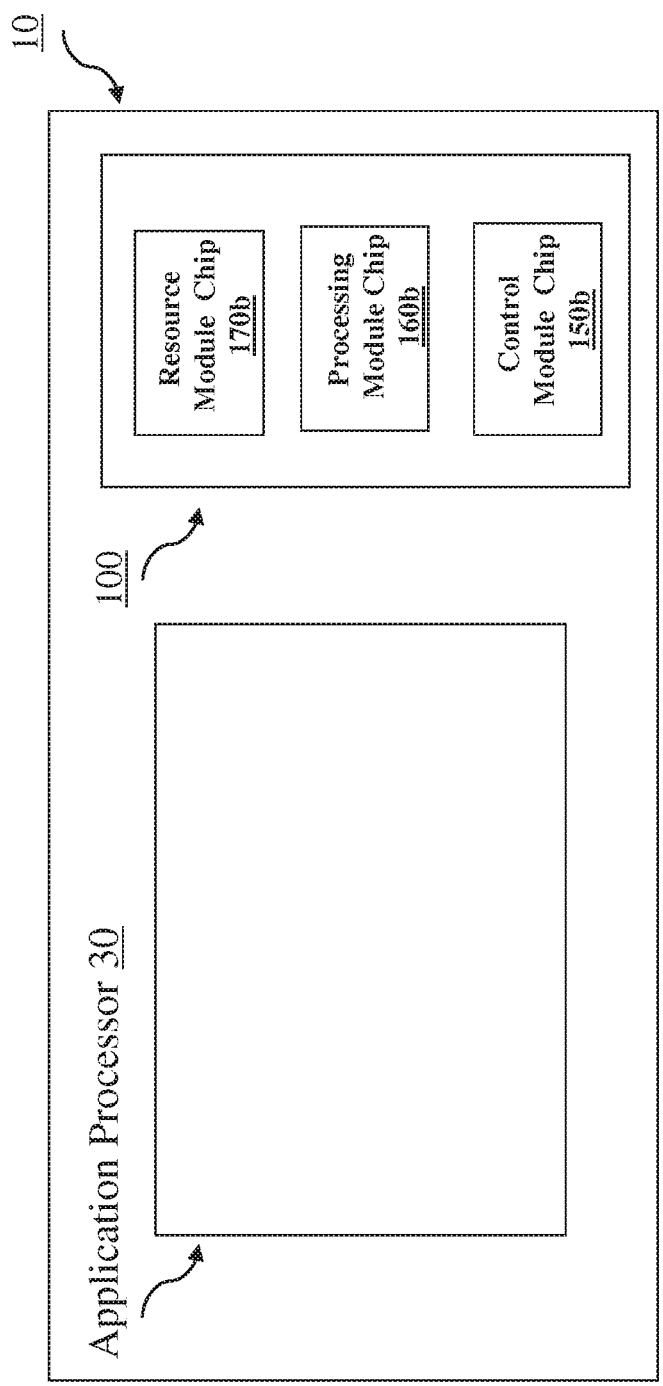
FIG. 7b shows an embodiment of implementing MCM in a Mobile Device as a hardware chip.

Turning next to FIG. 7b, an embodiment of implementing MCM Unit 100 as hardware chips is shown. In this implementation, MCM Unit 100 is shown as one or more chips integrated into Mobile Device 10. MCM Unit 100 comprises of a hardware implementation of Control Module 150 shown as a Control Module 150b, a hardware implementation of Processing Module 160 shown as a Processing Module 160b, and a hardware implementation of Resource Module 170 shown as a Resource Module 170b. In one embodiment, each of these modules is an individual chip. In another embodiment, they are part of the same chip. In another embodiment, they may be combinations of several chips.

Figure 7C:
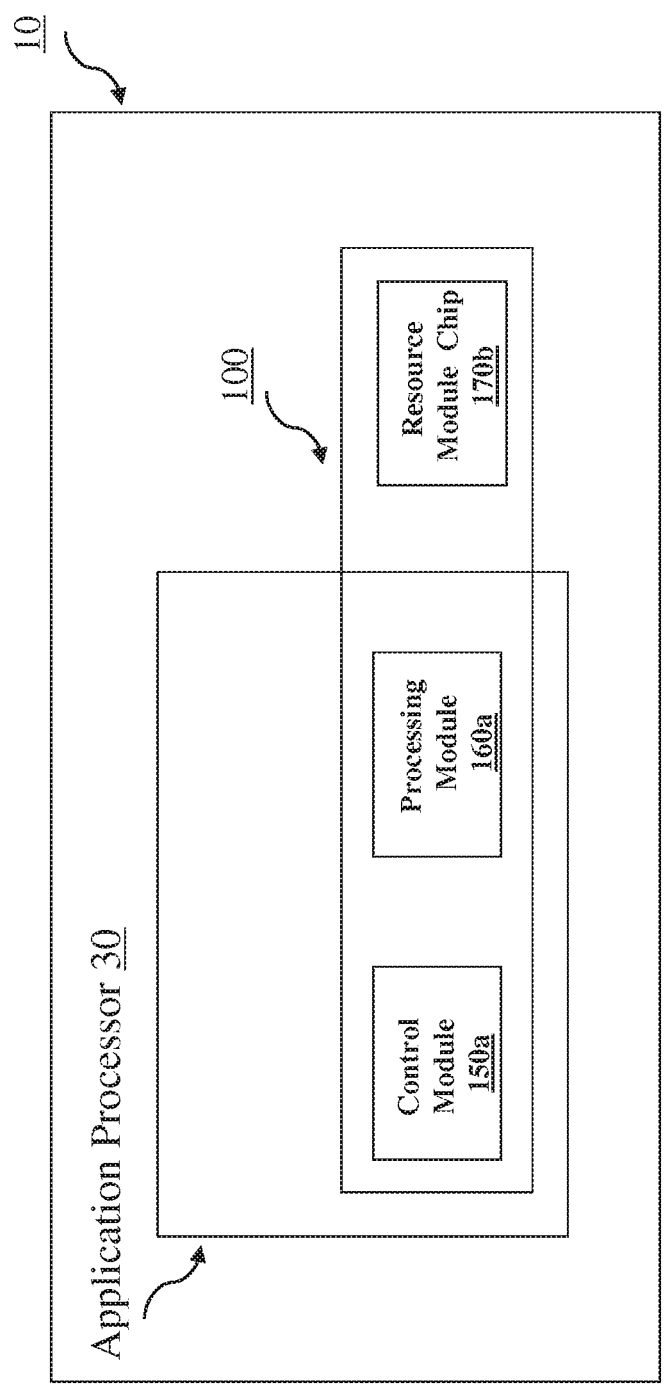
FIG. 7c shows an embodiment of implementing MCM in a Mobile Device as a combination of software and hardware modules.

Turning next to FIG. 7c, an embodiment of implementing MCM Unit 100 as a combination of software and hardware is shown. In this implementation, Resource Module 170 of MCM Unit 100 is shown as an chip integrated into Mobile Device 10. MCM Unit 100 comprises of a software implementation of Control Module 150 shown as a Control Module 150a, a software implementation of Processing Module 160 shown as a Processing Module 160a, and a hardware implementation of Resource Module 170 shown as a Resource Module 170b.

In one embodiment, Control Module 150 is implemented in software as Control Module 150a, while Processing Module 160 and Resource Module 170 are implemented in hardware. In another embodiment, Both Control Module 150 and Resource Module 170 are implemented in software while Processing Module 160 is implemented in hardware.

In another embodiment, part of Control Module 150, Processing Module 160, and/or Resource Module 170 is implemented in software and the rest in hardware.

MCM may be implemented in more than one Mobile Device. For instance, software implementation of MCM Unit 100 of FIG. 7a may not provide adequate performance. Flexibility of MCM allows for various modules or parts of modules to be implemented across multiple Mobile Devices 10.

FIG. 8 shows MCM Unit 100 implement in two Mobile Devices, Mobile Device 10-A and Mobile Device 10-B. In the embodiment shown, Resource Module 170a and Control Module 150a are implemented in Mobile Device 10-A. Processing Module 160a is implemented in Mobile Device 10-B. The two Mobile Devices are connected by a wired or wireless connection, Connect 112.

While FIG. 8 shows one embodiment of implementing MCM Unit 100 across multiple Mobile Devices 10, there are many possibilities. Parts of each module may be implemented in multiple mobiles devices. In one embodiment, Resource Module 170 is implemented in one Mobile Device 10, Control Module 150 on another, and Processing Module 160 on yet another Mobile Device 10. In one embodiment, the modules are implemented in hardware. In another implementation, they are implemented in software. In other embodiments, modules may be implemented in any combination of software and hardware.

MCM may be implemented in special add-on devices that function in conjunction with Mobile Devices.

Figure 9A:
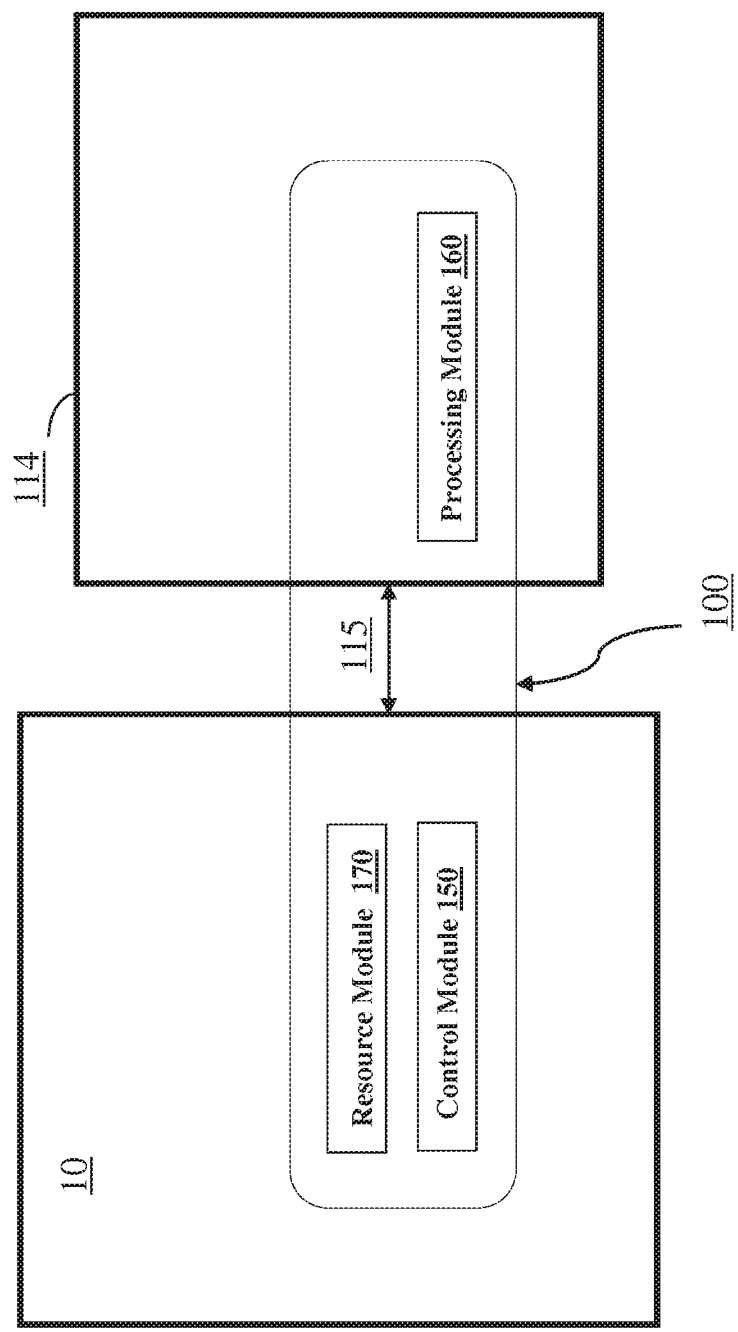
FIG. 9a shows an embodiment of implementing part of MCM in a Mobile Device and the rest in an Add-on device.

Turning to FIG. 9a, an Add-on Device 114 is shown connected to Mobile Device 10 via an Add-on Link 115. The figure shows an embodiment of implementing part of MCM Unit 100 in Add-on Device 114. Add-on Link 115 can be a wired link, wireless link, or a connector.

In one embodiment, Add-on Link 115 is a wireless link. It can use Radio Frequency (RF) link, WiFi type of wireless communication link, or special purpose wireless link.

In another embodiment, Add-on Link 115 may be a serial communication link such as an Ethernet, a parallel communication link such as cable, or a special purpose link such as the High-Definition Multimedia Interface (HDMI) link.

In yet another embodiment, Add-on Link 115 may be a connector such as a Universal Serial Bus (USB) port, a docking connector, or a special purpose connector.

As seen, there are numerous possible implementations for Add-on Link 115. Practically any of the industry standard connections and/or special purpose connections can be used for Add-on Link 115.

In the embodiment shown in FIG. 9a, Processing Module 160 is implemented in Add-On Device 114 while Control Module 150 and Resource Module 170 are implemented in Mobile Device 10. FIG. 9b shows an embodiment wherein all three modules of MCM, Control Module 150, Processing Module 160, and Resource Module 170 are implemented in Add-on Device 114.

Along with MCM modules, Add-on Device 114 may implement other related components such as memory and power source.

Figure 9C:
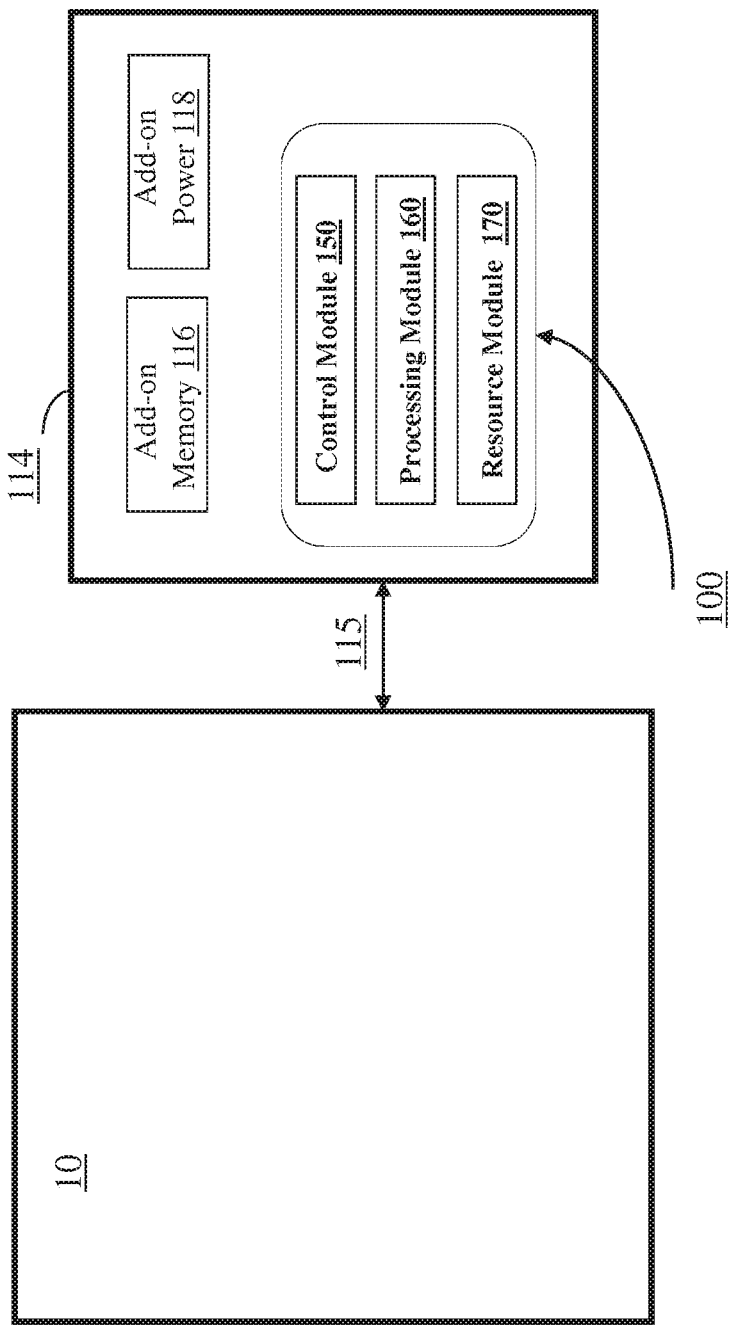
FIG. 9c shows an embodiment of implementing MCM in an Add-on device with other components.

While there are many embodiments possible, FIG. 9c shows an embodiment of Mobile Device 10 with Add-on Device 114. Add-on Device 114 comprises of MCM Unit 100, an Add-on Memory 116, and an Add-on Power Unit 118. In this embodiment, entire MCM Unit 100 resides in the Add-on Device 114. It connects to Mobile Device 10 via Add-on Link 115. In addition to implementing MCM Unit 100, Add-on Device 114 has Add-on Memory 116 and Add-on Power Unit 118.

Add-on Memory 116 consists of memory that may include one or all available memory media such as a hard disk, RAM, DRAM, ROM, EEPROM, Flash, or Optic memory.

Typically, Add-on Memory 116 assists in MCM executing special purpose tasks. In one embodiment, Add-on Memory 116 may also assist in the operation of Mobile Device 10. In another embodiment, Add-on Memory 116 may be pre-loaded with data needed for MCM operations.

In one embodiment, Add-on Power Unit 118 is a power supply unit that comprises of power source such as a battery. This battery supplies power to the Add-on Unit 114. Power is a crucial in commodity in Mobile Devices. In some applications, adding additional resource may tax this precious commodity. Add-on Unit 114 with Add-on Power Unit 118 alleviates this crucial problem.

In one embodiment, part of the MCM Unit 100 may reside on Add-on Unit. In another embodiment, Add-on Device 114 may not have Add-on Power Unit 118. In another embodiment, Add-on Device 114 may not have Add-on Memory 116.

Figure 10:
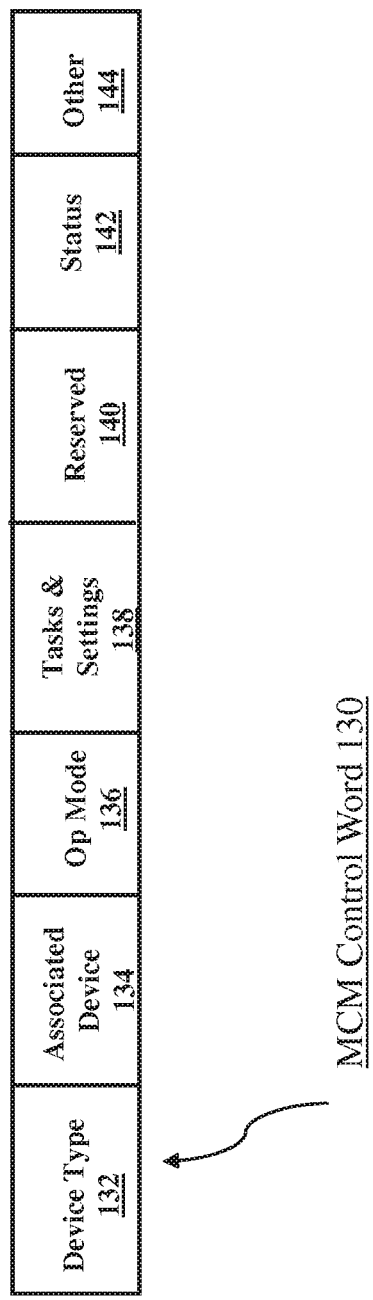
FIG. 10 shows a sample MCM Control Word.

Turning now to FIG. 10, a sample MCM Control Word 130 is shown. MCM Control Word 130 controls the operation of the MCM device within a MCM environment. Along with static information that assists the functioning of MCM, it also has dynamic information for the operation. To illustrate the workings of MCM, sample MCM Control Word 130 is shown in FIG. 10 with seven fields. It should be noted that many possible implementations of MCM Control Word 130 are possible. An MCM Control Word 130 may have one to 'n' fields, where 'n' can be as small as two or a large number.

In FIG. 10, MCM Control Word 130 has a Device Type 132, an Associated Device 134, an Op Mode 136, a Task & Settings 138, a Reserved 140, a Status 142, and an Other 144 fields.

Device Type 132 identifies the functionality of a given MCM Unit 100. The device could have all or some of MCM modules. It may also contain the configuration information of whether the device is set up to function as a Master or Slave in a given environment.

Associated Device 134 identifies which other devices are parts of this MCM Unit. Op Mode 136 defines the modes of operation, and Tasks and Settings 138 controls the execution of a task. Reserved 136 allows for additional functionalities in the future. Status 142 reflects the status of the device and the dynamic status of the execution of the assigned task. Other 144 is used for various operation specific tasks.

Mobile Devices 10 needs to be equipped with MCM Unit 100 to participate in MCM. Setting up MCM ID 120 and MCM Control Word 130, are essential part of the set up process.

Figure 11:
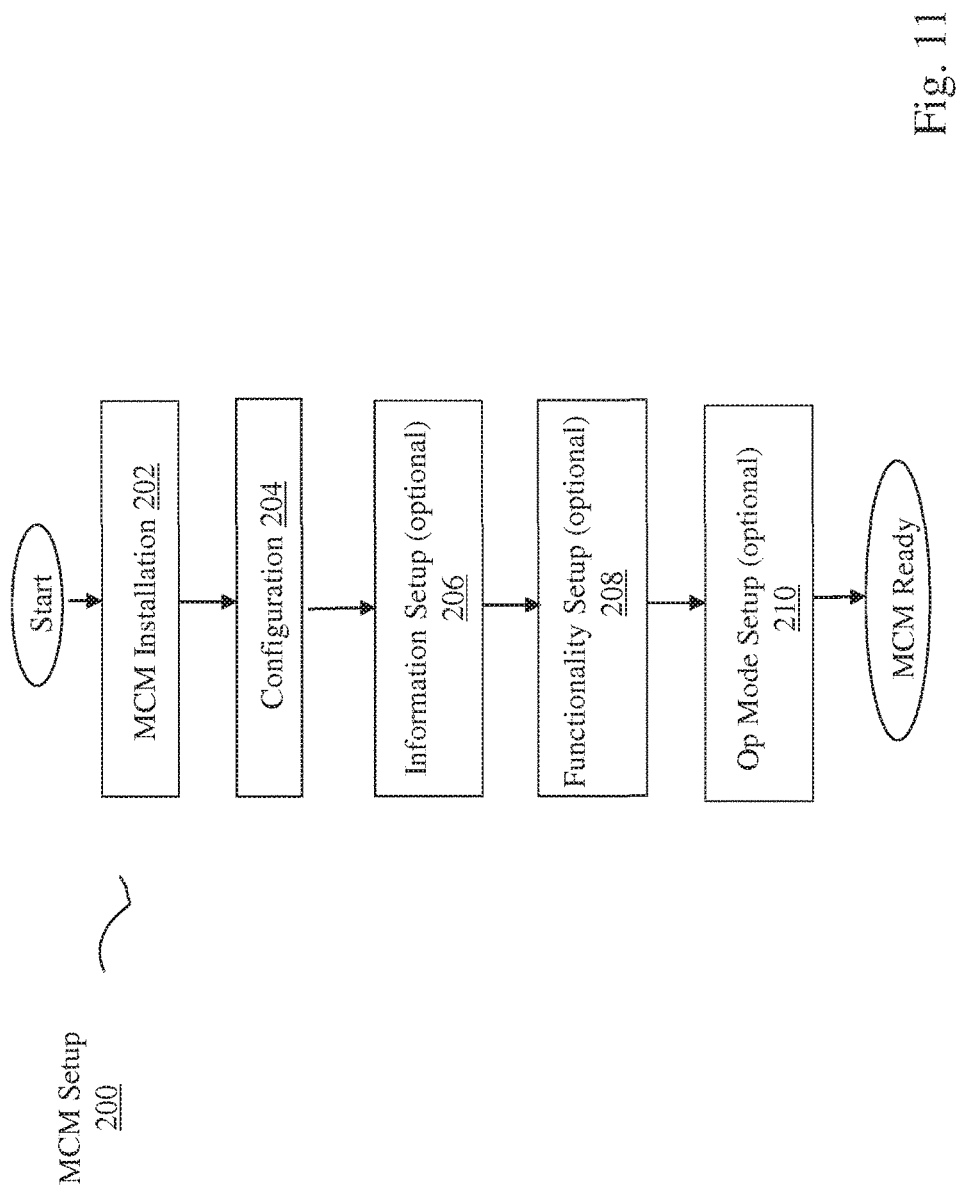
FIG. 11 shows a flowchart for setting up MCM.

Turning now to FIG. 11, a method MCM Setup 200 for setting up Mobile Device 10 to participate in MCM is shown. The method comprises of a MCM Installation 202 and a Configuration 204. It also contains optional processes of an Information Setup 206, a Functional Setup 208, and an Op Mode Setup 210.

MCM Installation 202 includes installing MCM components into Mobile Device 10. This includes both hardware and software components of MCM. In one embodiment, hardware may consist of one or more chips. In another embodiment, it may comprise of Intellectual Property (IP) incorporated into the Application Processor 30. In yet another embodiment, hardware may comprise of a plugin device such as Add-on Device 114. In one embodiment, software component may be installed in the Application Processor 30. In another embodiment, it may be installed into MCM hardware. In yet another embodiment, it may be installed into both Application Processor 30 and MCM hardware.

Following MCM Installation 202, Mobile Device 10 may be configured to run in one or more MCM Environments. Configuration 204 configures Mobile Device 10 to operate in one or more MCM Environments 102. The process of Configuration 204 includes setting up MCM ID 120 and Control Word 130.

Some embodiments may optionally include Information Setup 206. Information Setup 206 may load information required by specific operations of Mobile Device 10. In one embodiment, information is loaded into the Memory 16 of Mobile Device 10. In another embodiment, information is loaded into Add-On Memory 116 of Add-on Device 114.

In one embodiment, information loaded is control or algorithms to execute the operation. In another embodiment, information loaded may be data to be used by the operation. In yet another embodiment, both data and control may be loaded.

In some embodiments, as part of MCM Setup 200, Mobile Device 10 may be set up functionality it needs to execute. This is shown as Functionality Setup 208 in FIG. 11. Functionality Setup 208 includes setting up Mobile Device 10 to function as a Master or Slave in a given MCM Environment 102. In one embodiment, Mobile Device 10 may be set up as Primary Master for one MCM environment and Slave for another MCM environment. In another embodiment, Mobile Device 10 may be set up to participate as Slave in all environments. There are many possible set ups for a given Mobile Device 10.

Optionally, as part of the MCM setup, MCM Device may be set up to operate in various operation modes. Op Mode Setup 210 may set up Mobile Device to start the operation in certain mode. In one embodiment, Op Mode Setup 210 may set up Mobile Device 10 to operate in Secure Mode. In this mode, the device may participate in only specific environments and communicate exclusively with other secure devices.

In another embodiment, Op Mode Setup 210 may set up Mobile Device 10 to operate in Open Mode. In this mode, the device may participate in any MCM environment and communicate with any other devices.

In one embodiment, operating mode of a Mobile Device 10 is dynamic and can change after the initial set up performed by Op Mode Setup 210. In another embodiment, operating mode of a Mobile Device 10 is static and cannot change after the initial set up performed by Op Mode Setup 210.

Following MCM Installation 200, Mobile Device 10 will be ready to participate in MCM.

Multiple MCM devices may work in tandem to solve real-time computation problems in the field. To execute a particular task, they need to be set up in the field. Due to the dynamic nature of Mobile Devices, availability of a given device is not guaranteed. MCM considers this and enables the set up and operation of a dynamic environment.

MCM devices that have gone through MCM Setup 200 are ready to participate in one or more MCM environments. They will be configured with appropriate MCM ID 120 and MCM Control Word 130.

To operate in MCM, a MCM Environment 102 has to be set up. For a given MCM Environment 102, at least one of the devices will be set up as the Master that will initiate a given task. Other devices will be considered as Slaves. For a given task, there could be multiple Masters for redundancy. One of the Masters can be designated as the Primary Master and others as Secondary Masters.

Figure 12:
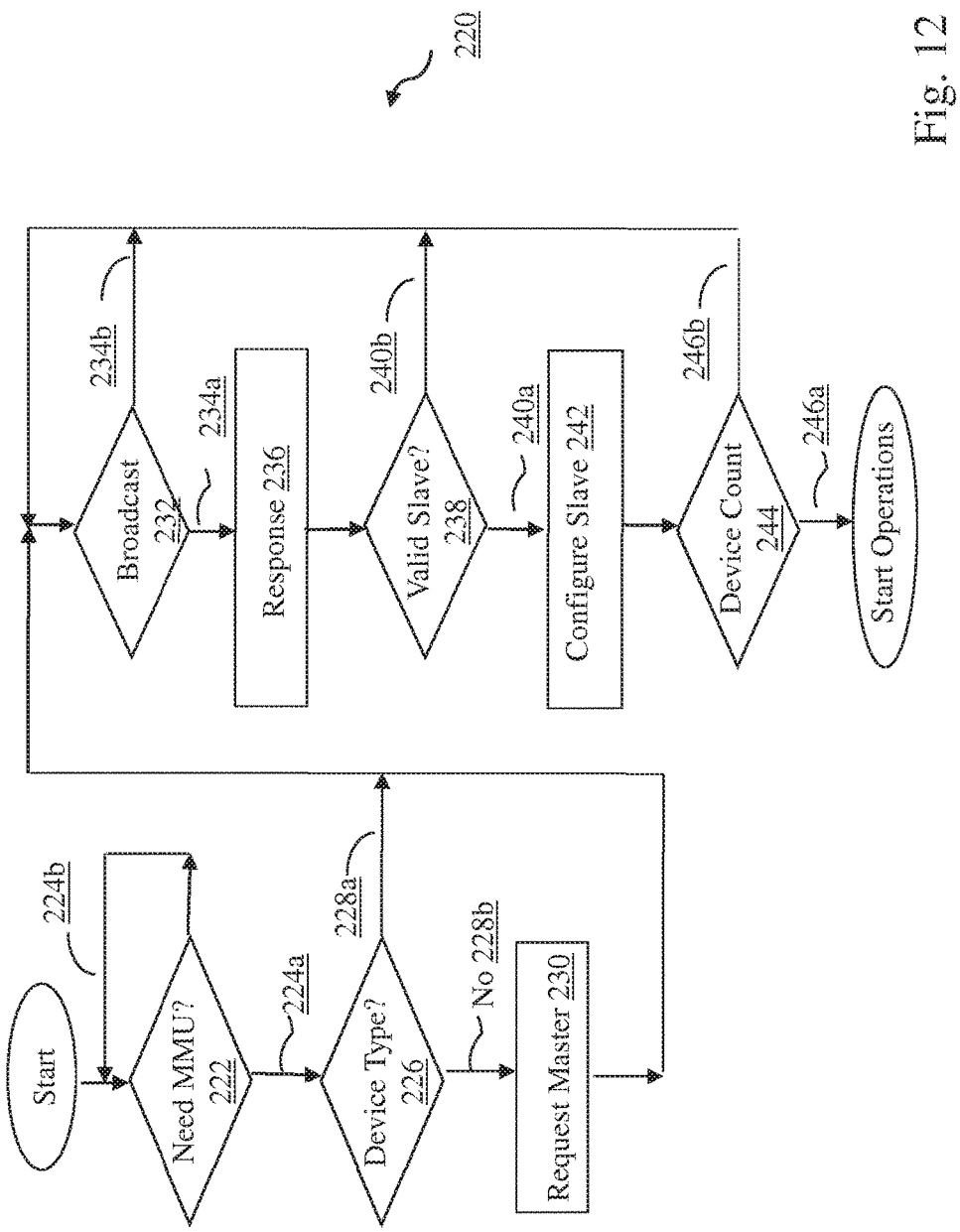
FIG. 12 shows a flowchart for a sample method to setting up MCM environment.

Turning now to FIG. 12, a method to set up a MCM environment is shown. The figure shows an embodiment of MCM Environment Setup 220 comprising of a Need MMU check 222, a Device Type check 226, a Request Master 230, a Broadcast 232, a Response 236, a Valid Slave 238, a Configure Slave 242, and a Device Count 244.

A Mobile Device 10 that is set up with MCM may participate in MCM functions. When active, such a device may be set up to recognize the need to share a task. This is shown as Need MMU check 222 in FIG. 12. In one embodiment, the check may start with a button click. In another embodiment, an event may trigger this check. In another embodiment, this may be done periodically. There are many possible ways this check cloud be triggered.

Following a Need MMU check 222, if there is no need as shown by 224*b*, the device will continue to remain in the state of checking for the need. When a need is detected, a check for the device type is conducted depicted by Device Type check 226. If the device is a Mobile Device 10 designated as Master, it will initiate a Broadcast 232 shown as 228*a*. If the device is a Mobile Device 10 designated as a Slave, it will look for a Master to initiate the Broadcast as shown by 228*b* and Request Master 230. Master will then initiate a Broadcast 232.

When Mobile Device 10 designated as a Master initiates Broadcast 232, it will wait for a response. If no other device responds, Mobile Device 10 designated as Master will continue to broadcast as shown by 234*b*. If any other MCM enabled device receives this broadcast shown by 234*a*, it will generate Response 236. Broadcasting Mobile Device 10 designated as Master will check the validity of a responding slave. This Valid Slave check 238 includes the checking of MCM ID 120 and MCM Control Word 130. If the Valid Slave check 238 determines that the responding device is not eligible to participate in the task, it will reject the device and go back to broadcasting for valid devices shown as 240*b*. If the Valid Slave check 238 determines that the device is acceptable, Configure Slave 242 will be initiated via 240*a*. Following the configuration of the slave, initiating Mobile Device 10 designated as Master will then check if it has sufficient devices to perform the task at hand shown as Device Count check 244. If Mobile Device 10 designated as Master determines that it requires additional devices, it will initiate additional broadcasts shown by 246*b*.

If the Mobile Device 10 designated as Master determines that it has enough devices to execute the task, it will stop the broadcast and begin to start the operations as shown by 246*a*.

Once an MCM environment is setup, one or more Mobile Device 10 designated as Masters may control the operation and task execution of the environment. In one embodiment, a Mobile Device 10 designated as Master may designate the operation of task allocation to one or more Salves. In another embodiment, multiple Mobile Devices 10 designated as Masters may share the work of allocating tasks.

Figure 13:
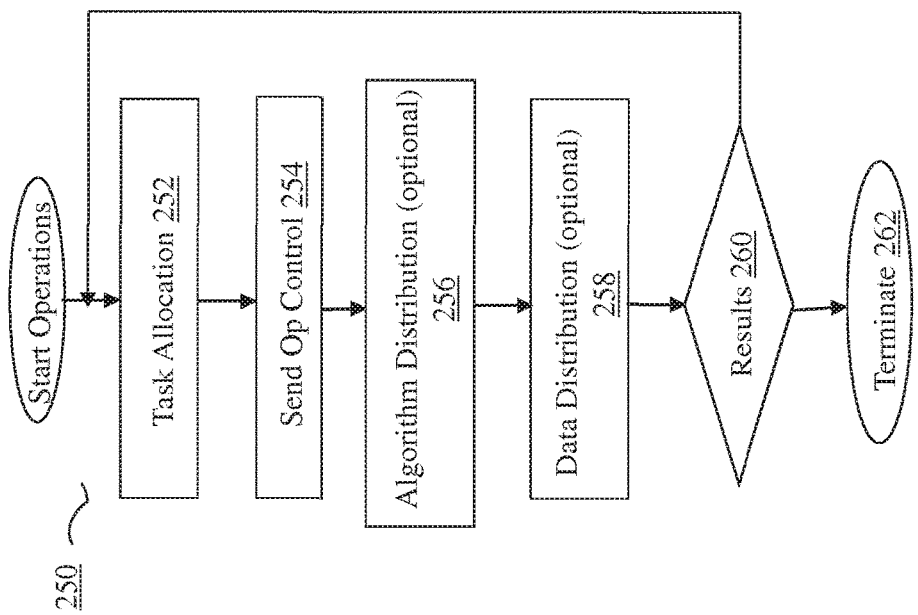
FIG. 13 shows a flowchart for sample basic operation of MCM.

Turning now to FIG. 13, a simple method for executing tasks in MCM is shown. It should be noted that while a simple embodiment of the method is shown to illustrate the working of MCM, many variations are possible.

FIG. 13 shows a method, MCM Operation 250. It comprises of a Task Allocation 252, a Send Operation Control 254, an optional Algorithm Distribution 256, an optional Data Distribution 258, a Results 260, and a Terminate 262.

After a Mobile Device 10 designated as the Master sets up an MCM Environment and is ready to start operations, it will begin to allocate tasks shown by Task Allocation 252. Task Allocation 252 will distribute the task to other MCM Environment members based on criteria defined by task allocation policies.

Following Task Allocation 252, Mobile Device 10 designated as the Master will send necessary control information shown as Send Op Control 254. Optionally, Mobile Device 10 designated as the Master may also send algorithms for execution shown as Algorithm Distribution 256 and data shown as Data Distribution 258.

In one embodiment, algorithms needed for executing tasks and/or data may be pre-loaded to the Mobile Devices 10. In this case, Algorithm Distribution 256 and Data Distribution 258 may not be required.

Following the execution of the task, results of the execution will be sent back to Mobile Device 10 designated as Master. Result may also be distributed to other Mobile Devices 10 in the cluster environment. This is shown as Result 260 in FIG. 13. Upon receiving the results, Mobile Device 10 designated as Master will evaluate the results. If the results are satisfactory, Master may end the MCM Setup with Terminate 262. Terminate 262 will initiate sequences for terminating active MCM environment. This will release all devices to participate in other MCM activities, if needed.

After a MCM environment is set up and it is active, MCM provides several mechanisms to monitor and maintain the integrity of the environment.

Figure 14:
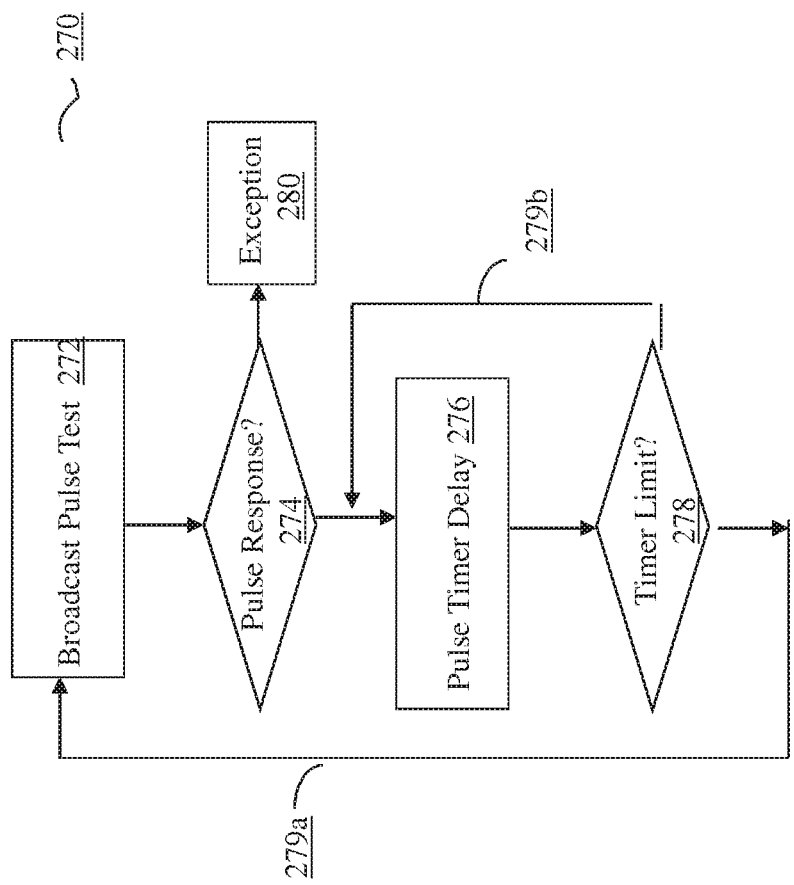
FIG. 14 shows a flowchart for sample maintenance operation of MCM for assuring the integrity of the cluster.

FIG. 14 shows a method, Pulse Check 270, that assures the availability of devices. FIG. 14 shows Pulse Check 270 comprising of a Broadcast Pulse Test 272, a Pulse Response check 274, a Pulse Timer Counter 276, a Pulse Timer Limit 278, and an Exception 280.

Mobile Device 10 designated as the Master of a MCM Environment 102 periodically initiates Broadcast Pulse Test 272. It then waits for responses from other member Mobile Devices 10 in the environment. If all members respond, Pulse Timer Delay 276 is initiated. When the Delay Limit 278 detects that it is time to initiate another pulse test, Broadcast Pulse Test 272 is invoked again shown as 279a.

If a member does not respond to a pulse test, Exception 280 is invoked. MCM allows various mechanisms to handle the exception of no response to a pulse test. In one embodiment, Master may re-send the pulse test to that slave device. In another embodiment, Master may remove non-responding Slaves from the environment and re-assign the task to other members of the environment.

One of the key problems with mobile systems working in a cluster environment is the fact that Mobile Devices, by nature, are mobile. The topology and inter-connection between devices may change often. MCM provides several innovative mechanisms to handle this problem. Unlike fixed cluster and parallel processing schemes, MCM does not rely on specific configuration. Devices participating in an environment do not have to communicate with only neighbors. Neighbors can be changing and it will not have to communicate with fixed devices. They can communicate with any device within its communication range.

Figure 15:
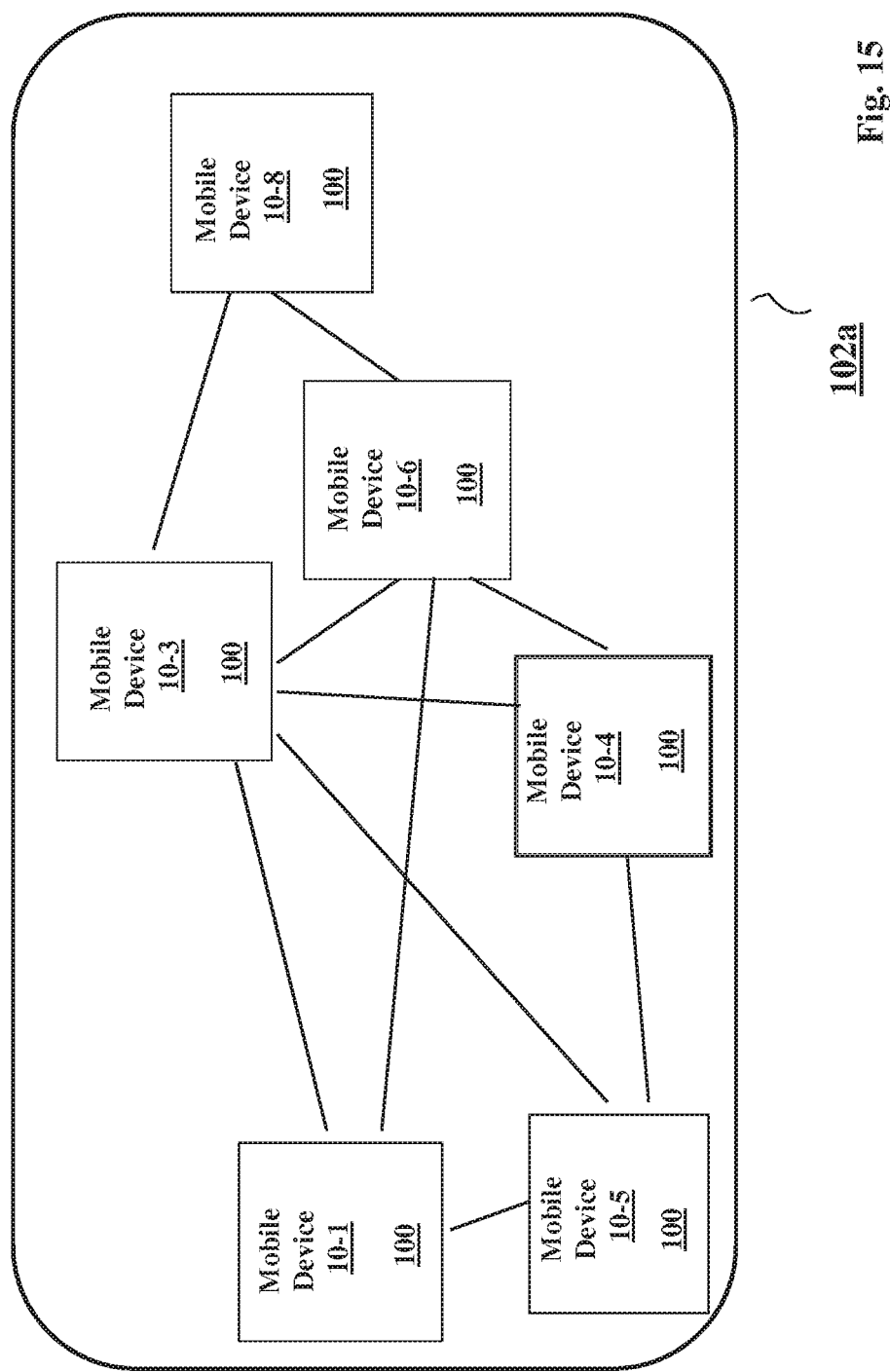
FIG. 15 depicts a sample MCM environment.

Turning now to FIG. 15, MCM Environment 102a of FIG. 3 is shown. Referring now to both FIG. 3 and FIG. 15, Mobile Device 10-4 has Mobile Devices 10-3 and Mobile Device 10-6 as its immediate neighbors in FIG. 3, while it has Mobile Device 10-3, Mobile Device 10-5, and Mobile Device 10-6 as its immediate neighbors in FIG. 15. Mobile Device 10-8 has Mobile Device 10-1, Mobile Device 10-3, Mobile Device 10-6, and Mobile Device 10-5 as its neighbors in FIG. 3, while it has Mobile Device 10-3 and Mobile Device 10-6 as its neighbors in FIG. 15.

As seen, the topology of MCM Environment 102a has changed from FIG. 3 to FIG. 15. However, this will not affect the operations of MCM. In FIG. 15, if Mobile Device 10-1 needs to communicate with Mobile Device 10-8, it will use Mobile Device 10-3 or Mobile Device 10-6 for indirect communication link.

Another issue arises from the possibility that moving devices may move in and out of the communication range of the devices in a cluster environment.

Figure 16:
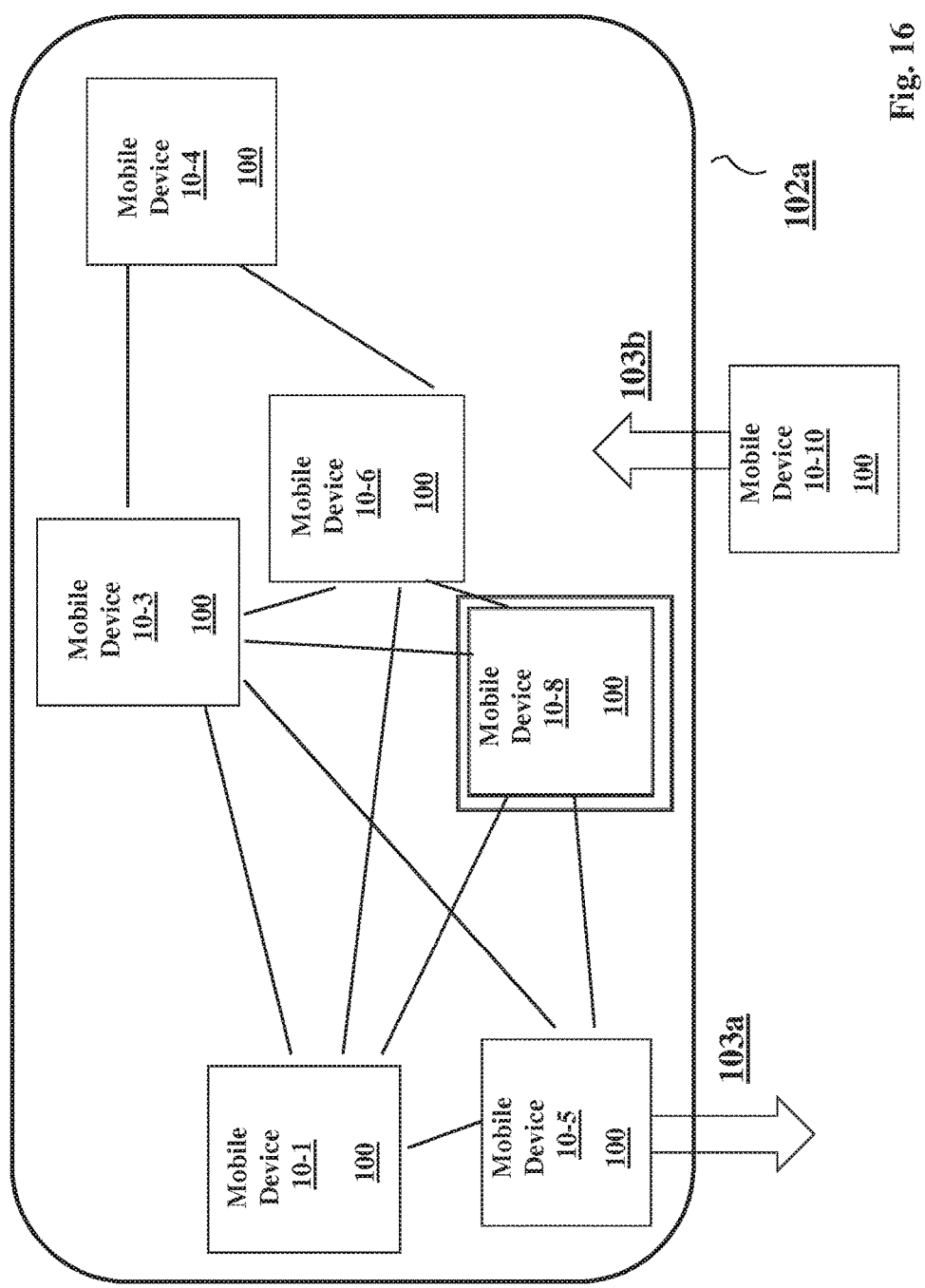
FIG. 16 shows the roaming of Mobile Devices in MCM.

Turning to FIG. 16, an embodiment of MCM Environment 102a of FIG. 3 is shown. In addition to MCM Environment 102a, FIG. 16 comprise of events, a Leaving Cluster Range 103a and an Entering Cluster Range 103b.

In the figure, Mobile Device 10-5 is shown leaving the cluster communication range shown via Leaving Cluster Range 103a. MCM allows for several mechanisms to detect devices losing communication capability. In one embodiment, Pulse Check 270 will periodically monitor all devices. When it detects that a device has lost its communication capabilities, it will initiate Exception 280 that will handle the device missing case.

In another embodiment, Mobile Devices 10 in active MCM environment may be set up the send 'I am moving' signal when it moves beyond a certain set limit of distance.

In yet another embodiment, Mobile Devices 10 in active MCM environment may monitor its location by means of GPS or other methods. Using its location and/or co-ordinates, it may realize that it is moving out of communication range from other MCM environment device. Such a device may intimate other devices in the environment that it is leaving the communication range.

Once the departure of a Mobile Device 10 is realized, Master of the environment may reallocate the task to other devices in the environment.

Mobile Device 10 equipped with MCM and setup work in a given environment might enter an environment communication range. In FIG. 16, Mobile Device 10-10 is shown entering MCM Environment 102a via Entering Cluster Range 103b. Such a device may periodically broadcast to check if there is a MCM Environment active. If it finds an environment, such as MCM Environment 102a, it may volunteer to participate in the tasks. Master will then check to see the eligibility of the device and may include it in its task.

MCM allows Mobile Devices participating in an environment to temporarily excuse itself from the tasks of the MCM environment. In FIG. 16, Mobile Device 10-8 participating in MCM Environment 102a may declare itself 'Busy' to participate in MCM tasks. In one embodiment, this may be due to it having to dedicate its compute resource to local computation demand. In another embodiment, this may be due to it being short of resource like bandwidth. In another embodiment, it may be running low on its memory resources. In yet another embodiment, it may be running low on battery power. In yet another embodiment, it may have been preempted to participate in another MCM environment.

In FIG. 16, Mobile Device 10-8 is shown to be in 'Busy' state. Such a device may be preempted by Mobile Device 10 designated as Master for the MCM Environment 102a. If the Master feels that the task at hand is crucial and it needs the busy device to execute it, it may preempt the 'Busy' Mobile Device 10-8 to execute MCM tasks.

In one embodiment, Master may check why a device has gone 'Busy'. If it determines that MCM task is of critical nature, it may preempt the 'Busy' device unless the device is experiencing a potential failure condition.

As seen, there are various embodiments for leaving, entering, busy, and preempt states. The embodiments described are illustrative for demonstrating the flexibility of MCM.

MCM introduces an efficient and effective framework that enables mobile cluster computing.

In addition to enabling cluster capabilities for Mobile Devices, MCM also introduces several other benefits:

1) Enhanced compute power: With MCM Unit 100, MCM provides additional compute power to function alongside Mobile Device 10 to enhance the computation capability of the system.

2) Real-time resource management: MCM introduces mechanisms for Mobile Devices to detect and manage resources in the real-time.

3) Task sharing: MCM enables the ability for a Mobile Device to dispatch a task to other qualified Mobile Devices that are MCM enabled.

4) Executing dispatched tasks: An MCM enabled Mobile Device will be able to lend its compute power to other qualified devices.

In accordance with above disclosure, a mechanism to enable real-time, high compute power in the field is contemplated. The invention contemplates achieving this by clustering more than one Mobile Devices working in tandem. The invention contemplates mechanisms to set up a mobile cluster computing system. It further contemplates mechanisms to efficiently maintain a mobile cluster computing system. It also contemplates on sharing tasks between various devices.

While the above description contains many specificities, these should not be construed as limitations on the scope of the invention, but rather as an exemplification of preferred embodiments thereof. Accordingly, the scope of the invention should be determined not by the embodiment(s) illustrated, but by the appended claims and their legal equivalents.

What is claimed is:

1. A mobile compute device adapted for engaging in cluster computing while in motion, comprising:
   a memory configured to store non-transitory computer readable instructions for enabling the mobile compute device to participate in a cluster processing system with other mobile compute devices;
   a telecommunication subsystem, configured to communicate with the other compute devices;
   at least one automated processor, configured to control the mobile compute device according to a first mode of operation, to:
   join a mobile cluster environment established by a master mobile compute device;
   receive a request for execution of a computational task through the telecommunication system from the master mobile compute device;
   transmit a response to the request to the master mobile compute device;
   execute at least a portion of the computational task, under at least partial control of the master mobile compute device; and
   dissolve the mobile cluster environment after completion of at least a portion of the computational task.

2. The mobile compute device according to claim 1, wherein the least one automated processor, is further configured to control the mobile compute device according to a second mode of operation, to:
   detect other mobile compute devices available for communication through the telecommunication system;
   establish a mobile cluster environment comprising the mobile compute device and the other detected configured mobile compute devices;
   send a request for execution of a computational task through the telecommunication system to the other mobile compute devices in the mobile cluster environment;
   receive a response to the request from the other mobile compute devices;
   validate response;
   control execution of the computational task, at least in part, by the other mobile compute devices; and
   dissolve the mobile cluster environment after completion of at least a portion of the computational task by at least one other mobile compute device.

3. A mobile compute device adapted for engaging in cluster computing while in motion, comprising:
   a memory configured to store non-transitory computer readable instructions for enabling the mobile compute device to control a cluster processing system comprising other mobile compute devices;
   a telecommunication subsystem, configured to communicate with the other compute devices;
   at least one automated processor, configured to control the mobile compute device according to a first mode of operation, to:
   detect other mobile compute devices available for communication through the telecommunication system;
   establish a mobile cluster environment comprising the mobile compute device and the other detected configured mobile compute devices;
   send a request for execution of a computational task through the telecommunication system to the other mobile compute devices in the mobile cluster environment;
   receive a response to the request from the other mobile compute devices;
   validate response;
   control execution of the computational task, at least in part, by the other mobile compute devices; and
   dissolve the mobile cluster environment after completion of at least a portion of the computational task by at least one other mobile compute device.

4. The mobile compute device according to claim 3, wherein the least one automated processor, is further configured to control the mobile compute device according to a second mode of operation, to:
   join a mobile cluster environment established by a master mobile compute device; receive a request for execution of a computational task through the telecommunication system from the master mobile compute device;
   transmit a response to the request to the master mobile compute device; execute at least a portion of the computational task, under at least partial control of the master mobile compute device; and
   dissolve the mobile cluster environment after completion of at least a portion of the computational task.

5. A mobile clustering method, comprising:
   providing a plurality of mobile compute devices, each having mobile clustering functionality;
   detecting availability of one or more other mobile compute devices among said plurality of mobile compute devices;

establishing a mobile cluster environment comprising the plurality of available mobile compute devices comprising at least one mobile compute device which is in motion;
receiving at least one request for execution of a computational task;
broadcasting a signal in response to receipt of the at least one request to the plurality of available mobile compute devices;
acknowledging receipt of the broadcast signal by the plurality of mobile compute devices;
determining eligibility of members of the plurality of available mobile compute devices to process at least a portion of the at least one request;
distributing the at least one request to the plurality of mobile compute devices acting in the mobile cluster environment to share the execution of the at least one request,
transmitting a termination signal to dissolve the mobile cluster environment to share the execution of the at least one request.

6. The mobile clustering method according to claim 5, wherein at least said broadcasting, determining eligibility and distributing are performed by a master device of the mobile cluster environment.

7. The mobile clustering method according to claim 5, wherein each mobile compute device communicates wirelessly.

8. The mobile clustering method according to claim 5, wherein the request comprises data processing, further comprising transmitting data to be processed to each of the plurality of mobile compute devices.

9. The mobile clustering method according to claim 5, further comprising:
establishing a mobile ad hoc communication network between the mobile compute devices; and
altering a network communication path between at least two of the mobile compute devices due to the movement of the at least one mobile compute device which is in motion.

10. The mobile clustering method according to claim 5, wherein the mobile clustering environment is tolerant to a departure of at least one mobile compute device during execution of the at least one request.

11. The mobile clustering method according to claim 5, wherein the mobile clustering environment is tolerant to an addition of at least one mobile compute device to the mobile cluster environment during execution of the at least one request.

12. The mobile clustering method according to claim 5, wherein said receiving, said broadcasting, said acknowledging, said determining eligibility, and said distributing occur concurrently with sharing the execution of at least one prior request.

13. The mobile clustering method according to claim 5, further comprising periodically transmitting a signal to verify members of the plurality of mobile compute devices.

14. The mobile clustering method according to claim 5, further comprising executing, by a mobile compute device, a cluster termination process prior to terminating availability for processing requests.

15. The mobile clustering method according to claim 5, further comprising communicating, by a mobile compute device, a suspend signal to identify the respective mobile compute device as busy and temporarily unavailable for processing requests.

16. The mobile clustering method according to claim 5, further comprising communicating control signals and data to each eligible mobile compute device.

17. The mobile clustering method according to claim 5, further comprising:
determining a location of at least one mobile compute device, and
at least one of:
determining eligibility to process at least a portion of the at least one request by the at least one mobile compute device, and
distributing the at least one request to the at least one mobile compute device, selectively in dependence on the determined location.

18. The mobile clustering method according to claim 17, wherein the at least one mobile compute device comprises a global positioning system (GPS), and the at least one mobile compute device transmits its GPS determined location in response to the broadcast signal.

19. The mobile clustering method according to claim 5, further comprising:
transmitting a motion status from respective ones of the plurality of mobile compute devices; and
terminating shared execution of the execution of the at least one request by at least one mobile compute device selectively in response to the motion status.

20. The mobile clustering method according to claim 5, further comprising:
designating a master mobile compute device from among the plurality of mobile compute devices, the master mobile compute device being configured to remotely control other mobile compute devices; and
designating a plurality of slave mobile compute devices from among the plurality of mobile compute devices, the slave mobile compute devices each being configured to remotely receive and respond to control communications the master mobile compute device.

* * * * *